(12) United States Patent
Lai et al.

(10) Patent No.: US 11,323,248 B2
(45) Date of Patent: May 3, 2022

(54) METHODS FOR THRESHOLD PASSWORD-HARDENED ENCRYPTION AND DECRYPTION

(71) Applicant: Friedrich-Alexander-Universität Erlangen-Nürnberg, Erlangen (DE)

(72) Inventors: Russell W. F. Lai, Nuremberg (DE); Dominique Schröder, Nuremberg (DE); Christoph Egger, Erlangen (DE); Julian Brost, Erlangen (DE)

(73) Assignee: Friedrich-Alexander-Universität Erlangen-Nürnberg, Erlangen (DE)

( * ) Notice: Subject to any disclaimer, the term of this patent is extended or adjusted under 35 U.S.C. 154(b) by 0 days.

(21) Appl. No.: 17/217,606

(22) Filed: Mar. 30, 2021

(65) Prior Publication Data

US 2021/0314142 A1     Oct. 7, 2021

(30) Foreign Application Priority Data

Mar. 31, 2020   (EP) .................................... 20167386

(51) Int. Cl.
*H04L 29/06* (2006.01)
*H04L 9/06* (2006.01)
*H04L 9/08* (2006.01)

(52) U.S. Cl.
CPC ............ *H04L 9/0656* (2013.01); *H04L 9/085* (2013.01)

(58) Field of Classification Search
None
See application file for complete search history.

(56) References Cited

U.S. PATENT DOCUMENTS

| 8,769,127 B2* | 7/2014 | Selimis | H04L 67/06 709/227 |
| 10,819,522 B1* | 10/2020 | Roy | H04L 9/3226 |
| 2003/0105959 A1* | 6/2003 | Matyas, Jr. | G06F 21/6245 713/168 |
| 2007/0124321 A1* | 5/2007 | Szydlo | H04L 9/3218 707/999.102 |

(Continued)

OTHER PUBLICATIONS

European Search Report issued for corresponding European Patent Application No. EP20167386.0 dated Sep. 14, 2020.

(Continued)

*Primary Examiner* — Maung T Lwin
(74) *Attorney, Agent, or Firm* — Myers Wolin, LLC

(57) ABSTRACT

A Computer-implemented method is provided for encrypting data by a server in cooperation with a predetermined number of rate limiters. The method includes receiving, by the server, a user identification, and a password to be encrypted and creating a secret message, the secret message being a key suitable for use with a symmetric key encryption/decryption scheme. The method further includes generating, on the basis of a predetermined interactive cryptographic encryption protocol, a ciphertext which encrypts the user password, and the secret message using secret keys of the rate limiters of the subset, where the threshold is smaller than or equal to the number of rate limiters, and the protocol is adapted such that the server needs only to interact with a subset of the predetermined size of the number of rate limiters for decryption of the ciphertext to recover the secret message.

18 Claims, 9 Drawing Sheets

---

Setup($1^\lambda, 1^m, 1^t$)

Figure 1:
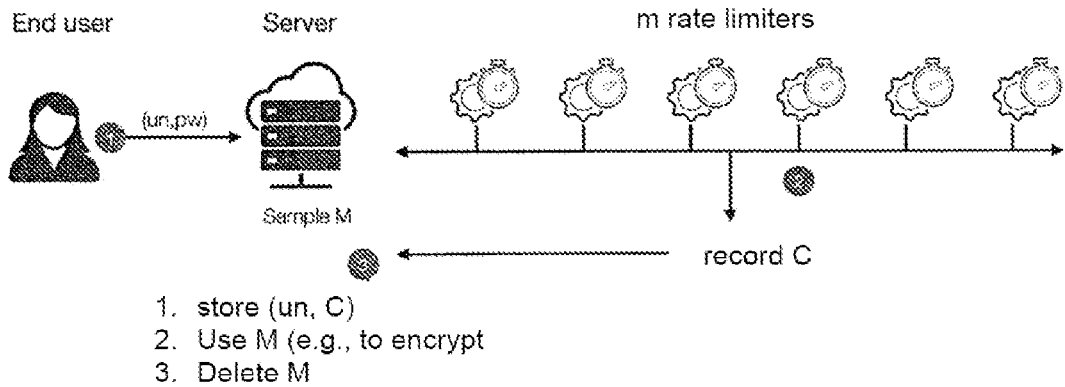

// $s$ and $S$ keys are used for encrypting password records

// $k$ and $K$ keys are used in the decryption protocol $\text{crs} := (\mathbb{G}, p, G) \leftarrow \text{GGen}(1^\lambda)$ $s_0 \leftarrow \text{SKE.KGen}(1^\lambda)$, $k_0 \leftarrow_\$ \mathbb{Z}_p$ // Server key $K_0 := G^{k_0}$ $\bar{s}_j, \bar{k}_j \leftarrow_\$ \mathbb{Z}_p, \forall j \in [0, t-1]$ // Rate-limiter keys (to be shared)

$\bar{s}(x) := \sum_{j=0}^{t-1} \bar{s}_j x^j$, $\bar{k}(x) := \sum_{j=0}^{t-1} \bar{k}_j x^j$ $\bar{S}_j := G^{\bar{s}_j}$, $\bar{K}_j := G^{\bar{k}_j}$, $\forall j \in [0, t-1]$ $s_i := \bar{s}(i)$, $k_i := \bar{k}(i)$, $\forall i \in [m]$ $\text{sk}_i := (s_i, k_i, K_0, \{\bar{S}_j, \bar{K}_j\}_{j=0}^{t-1})$   $\forall i \in [0, m]$ return $(\text{crs}, \text{sk}_0, \ldots, \text{sk}_m)$

(56) References Cited

U.S. PATENT DOCUMENTS

| | | | |
|---|---|---|---|
| 2010/0180116 A1* | 7/2010 | Coan | H04L 9/3249 |
| | | | 713/168 |
| 2019/0104057 A1* | 4/2019 | Goel | H04L 69/26 |
| 2019/0245688 A1* | 8/2019 | Patin | H04L 9/0869 |

OTHER PUBLICATIONS

Lai et al., "Simple Password-Hardened Encryption Services," 27th USENIX Security Symposium, pp. 1405-1421, retrieved from the Internet Aug. 14, 2018, URL:<https://www.usenix.org/sites/default/files/sec18_full_proceedings_interior.pdf>, USENIX Association.

Bagherzandi et al., "Password-Protected Secret Sharing," Computer and Communications Security, pp. 433-443, Oct. 17, 2011, Chicago, Illinois, USA.

* cited by examiner $\mathsf{Setup}(1^\lambda, 1^m, 1^t)$

// $s$ and $S$ keys are used for encrypting password records
// $k$ and $K$ keys are used in the decryption protocol
$\mathsf{crs} := (\mathbb{G}, p, G) \leftarrow \mathsf{GGen}(1^\lambda)$
$s_0 \leftarrow \mathsf{SKE.KGen}(1^\lambda),\ k_0 \leftarrow_\$ \mathbb{Z}_p$ // Server key
$K_0 := G^{k_0}$
$\bar{s}_j, \bar{k}_j \leftarrow_\$ \mathbb{Z}_p,\ \forall j \in [0, t-1]$ // Rate-limiter keys (to be shared)
$\bar{s}(x) := \sum_{j=0}^{t-1} \bar{s}_j x^j,\ \bar{k}(x) := \sum_{j=0}^{t-1} \bar{k}_j x^j$
$\bar{S}_j := G^{\bar{s}_j},\ \bar{K}_j := G^{\bar{k}_j},\ \forall j \in [0, t-1]$
$s_i := \bar{s}(i),\ k_i := \bar{k}(i),\ \forall i \in [m]$
$\mathsf{sk}_i := (s_i, k_i, K_0, \{\bar{S}_j, \bar{K}_j\}_{j=0}^{t-1})\quad \forall i \in [0, m]$
return $(\mathsf{crs}, \mathsf{sk}_0, \ldots, \mathsf{sk}_m)$

Figure 4

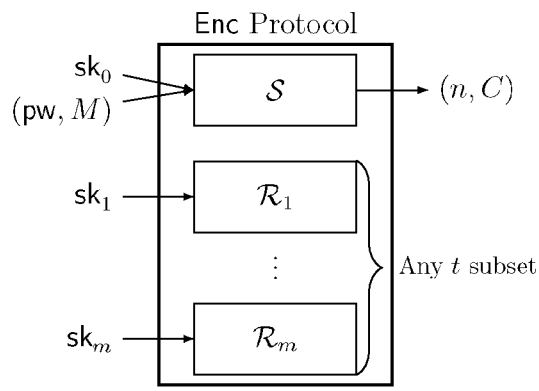

Figure 5

$\underline{\text{Enc}\langle \mathcal{S}(\text{``ENC''}, \text{sk}_0, \text{pw}, M), \cdots \rangle}$ ensure $\text{KVf}(0, \text{sk}_0)$
$n_0 \leftarrow_\$ \{0,1\}^\lambda$
receive $n_i$ from $\mathcal{R}_i \quad \forall i \in [m]$
$\mathcal{P} := \{i : n_i \neq \bot\}$
ensure $|\mathcal{P}| \geq t$
$P \leftarrow \text{Subset}_t(\mathcal{P})$
send $\{j, n_j\}_{j \in P \cup \{0\}}$ to $\mathcal{R}_i \quad \forall i \in P$
$n := H(\{i, n_i\}_{i \in P \cup \{0\}})$
$X_0 \leftarrow H_0(n), \ X_1 \leftarrow H_1(n)$
$Y_{0,0} \leftarrow H_0(\text{pw}, n), \ Y_{0,1} \leftarrow H_1(\text{pw}, n)$
receive $(Y_{i,0}, Y_{i,1}, \pi_i)$ from $\mathcal{R}_i \quad \forall i \in P$
$S_i := \prod_{j=0}^{t-1} \bar{S}_j^{i^j}, \ \forall i \in P$
ensure $\forall i \in P : \text{Vf}\left(\text{crs}, \begin{pmatrix} G & S_i \\ X_0 & Y_{i,0} \\ X_1 & Y_{i,1} \end{pmatrix}, \pi_i\right)$
$C_0 := \prod_{i \in P \cup \{0\}} Y_{i,0}^{\lambda_{P,i}}, \ C_1 := \prod_{i \in P \cup \{0\}} Y_{i,1}^{\lambda_{P,i}} \cdot M$
$C := \text{SKE.Enc}(s_0, (C_0, C_1))$
return $(n, C)$ $\underline{\text{Enc}\langle \cdots, \mathcal{R}_i(\text{``ENC''}, \text{sk}_i), \cdots \rangle, \ \forall i \in [m]}$ ensure $\text{KVf}(i, \text{sk}_i)$
$n_i \leftarrow_\$ \{0,1\}^\lambda$
send $n_i$ to $\mathcal{S}$
receive $\{j, n'_j\}_{j \in P \cup \{0\}}$ from $\mathcal{S}$
ensure $n_i = n'_i$
$n := H(\{i, n_i\}_{i \in P \cup \{0\}})$
$X_0 \leftarrow H_0(n), \ X_1 \leftarrow H_1(n)$
$Y_{i,0} \leftarrow X_0^{s_i}, \ Y_{i,1} \leftarrow X_1^{s_i}$
$S_i := G^{s_i}$
$\pi_i \leftarrow \text{Prove}\left(\text{crs}, \begin{pmatrix} G & S_i \\ X_0 & Y_{i,0} \\ X_1 & Y_{i,1} \end{pmatrix}, s_i\right)$
send $(Y_{i,0}, Y_{i,1}, \pi_i)$ to $\mathcal{S}$
return $\epsilon$

Figure 6

$\text{Dec}\langle\ldots\rangle$

Server $\mathcal{S}(\text{"DEC"}, \text{sk}_C, n, C)$ | Rate-limiter $\mathcal{R}_i(\text{"DEC"}, \text{sk}_i), \forall i \in [m]$
---|---
ensure $\text{KVf}(0, \text{sk}_0)$ | ensure $\text{KVf}(i, \text{sk}_i)$
$(C_0, C_1) \leftarrow \text{SKE.Dec}(s_0, C)$ |
ensure $(C_0, C_1) \neq \bot$ |

$\xrightarrow{n}$ $X_0 := H_0(n), \ X_1 := H_1(n)$ | $X_0 := H_0(n), \ X_1 := H_1(n)$
$Y_{C,0}^{-1} := C_0^{-1} \cdot H_0(\text{pw}, n)$ | $Y_{i,0} := X_0^{s_i}$ $\cdots\cdots\cdots\cdots$ Computing encryption of $Z := Y_{0,0}^{-1} \cdot \prod_{i \in P} Y_{i,0}^{\lambda_{P,i}}$ for some $t$-subset $P \subseteq [m]$ $\cdots\cdots\cdots\cdots$ $K := K_0 \cdot \tilde{K}_0$ | $K := K_0 \cdot \tilde{K}_0$
$r_0 \leftarrow_{\$} \mathbb{Z}_p, \ (U_0, V_0) := (G^{r_0}, K^{r_0} \cdot Y_{0,0}^{-1})$ | $r_i \leftarrow_{\$} \mathbb{Z}_p, \ (U_i, V_i) := (G^{r_i}, K^{r_i} \cdot Y_{i,0})$
$S_j := \prod_{\ell=0}^{t-1} \tilde{S}_\ell^{j^\ell}, \ \forall j \in [m]$ | $S_j := G^{\prod_{\ell=0}^{t-1} \tilde{S}_\ell^{j^\ell}}, \ \forall j \in [m] \setminus \{i\}$
$\pi_{1,0} \leftarrow \text{Prove}(\text{crs}, (G, U_0), r_0)$ | $S_i := G^{s_i}$
$\mathcal{P} := \left\{j \in [m] : \text{Vf}\left(\text{crs}, \begin{pmatrix} G, & 1, & S_j \\ I, & G, & U_j \\ X_C, & K, & V_j \end{pmatrix}, \pi_{1,j}\right) = 1\right\}$ | $\xleftarrow{U_i, V_i, \pi_{1,i}}$ $\pi_{1,i} \leftarrow \text{Prove}\left(\text{crs}, \begin{pmatrix} G, & 1, & S_i \\ I, & G, & U_i \\ X_0, & K, & V_i \end{pmatrix}, \begin{pmatrix} s_i \\ r_i \end{pmatrix}\right)$
ensure $|\mathcal{P}| \geq t$ |
$P \leftarrow \text{Subset}_t(\mathcal{P})$ | $\xrightarrow{\{(j, U_j, V_j, \pi_{1,j})_{j \in (P \cup \{0\}) \setminus \{i\}}\}}{\text{to } i \in P}$ ensure $\forall j \in P \setminus \{i\} : \text{Vf}\left(\text{crs}, \begin{pmatrix} G, & 1, & S_j \\ I, & G, & U_j \\ X_C, & K, & V_j \end{pmatrix}, \pi_{1,j}\right)$
 | ensure $\text{Vf}(\text{crs}, (G, U_0), \pi_{1,0})$
$(U, V) := \left(\prod_{j \in P \cup \{0\}} U_j^{\lambda_{P,j}}, \prod_{j \in P \cup \{C\}} V_j^{\lambda_{P,j}}\right)$ | $(U, V) := \left(\prod_{j \in P \cup \{0\}} U_j^{\lambda_{P,j}}, \prod_{j \in P \cup \{C\}} V_j^{\lambda_{P,j}}\right)$ $\cdots\cdots\cdots$ Computing encryption of $(Z^{\tilde{r}}, Z^{\tilde{r}'} \cdot H_1(\text{pw}, n) \cdot H_1(n)^{\sum_{i \in P} \lambda_{P,i} s_i})$ for some random $\tilde{r}$ and $\tilde{r}'$ $\cdots\cdots\cdots$ $\tilde{r}_0, \tilde{r}_0' \leftarrow_{\$} \mathbb{Z}_p$ | $\tilde{r}_i, \tilde{r}_i' \leftarrow_{\$} \mathbb{Z}_p$
$(\tilde{U}_0, \tilde{V}_0) := (U^{\tilde{r}_0}, V^{\tilde{r}_0}), \ (\tilde{U}_0', \tilde{V}_0') := (U^{\tilde{r}_0'}, V^{\tilde{r}_0'} \cdot H_1(\text{pw}, n))$ | $(\tilde{U}_i, \tilde{V}_i) := (U^{\tilde{r}_i}, V^{\tilde{r}_i}), \ (\tilde{U}_i', \tilde{V}_i') := (U^{\tilde{r}_i'}, V^{\tilde{r}_i'} \cdot X_1^{\lambda_{P,i} s_i})$
$\pi_{2,0} \leftarrow \text{Prove}\left(\text{crs}, \begin{pmatrix} U & \tilde{U}_0 \\ V & \tilde{V}_0 \end{pmatrix}, \tilde{r}_0\right)$ | $\pi_{2,i} \leftarrow \text{Prove}\left(\text{crs}, \begin{pmatrix} U & \tilde{U}_i \\ V & \tilde{V}_i \end{pmatrix}, \tilde{r}_i\right)$
$\pi_{2,0}' \leftarrow \text{Prove}\left(\text{crs}, (U, \tilde{U}_0'), \tilde{r}_0'\right)$ | $\xleftarrow{\tilde{U}_i, \tilde{V}_i, \pi_{2,i}, \tilde{U}_i', \tilde{V}_i', \pi_{2,i}'}$ $\pi_{2,i}' \leftarrow \text{Prove}\left(\text{crs}, \begin{pmatrix} U & I & \tilde{U}_i' \\ V & X_1^{\lambda_{P,i}} & \tilde{V}_i' \\ I & G & S_i \end{pmatrix}, \begin{pmatrix} \tilde{r}_i' \\ s_i \end{pmatrix}\right)$
ensure $\forall j \in P : \text{Vf}\left(\text{crs}, \begin{pmatrix} U & \tilde{U}_j \\ V & \tilde{V}_j \end{pmatrix}, \pi_{2,j}\right)$ | $\xrightarrow{\{(j, \tilde{U}_j, \tilde{V}_j, \pi_{2,j}, \tilde{U}_j', \tilde{V}_j', \pi_{2,j}')\}_{j \in (P \cup \{0\}) \setminus \{i\}}}{\text{to } i \in P}$ ensure $\forall j \in P \setminus \{i\} : \text{Vf}\left(\text{crs}, \begin{pmatrix} U & \tilde{U}_j \\ V & \tilde{V}_j \end{pmatrix}, \pi_{2,j}\right)$
ensure $\forall j \in P : \text{Vf}\left(\text{crs}, \begin{pmatrix} U & I & \tilde{U}_j' \\ V & X_1^{\lambda_{P,j}} & \tilde{V}_j' \\ I & G & S_j \end{pmatrix}, \pi_{2,j}'\right)$ | ensure $\forall j \in P \setminus \{i\} : \text{Vf}\left(\text{crs}, \begin{pmatrix} U & I & \tilde{U}_j' \\ V & X_1^{\lambda_{P,j}} & \tilde{V}_j' \\ I & G & S_j \end{pmatrix}, \pi_{2,j}'\right)$
 | ensure $\text{Vf}\left(\text{crs}, (U, \tilde{U}_0), \pi_{2,0}\right) \wedge \text{Vf}\left(\text{crs}, (U, \tilde{U}_0'), \pi_{2,0}'\right)$
$(\tilde{U}, \tilde{V}) := \left(\prod_{j \in P \cup \{0\}} \tilde{U}_j, \prod_{j \in P \cup \{0\}} \tilde{V}_j\right)$ | $(\tilde{U}, \tilde{V}) := \left(\prod_{j \in P \cup \{0\}} \tilde{U}_j, \prod_{j \in P \cup \{0\}} \tilde{V}_j\right)$
$(\tilde{U}', \tilde{V}') := \left(\prod_{j \in P \cup \{0\}} \tilde{U}_j', \prod_{j \in P \cup \{0\}} \tilde{V}_j'\right)$ | $(\tilde{U}', \tilde{V}') := \left(\prod_{j \in P \cup \{0\}} \tilde{U}_j', \prod_{j \in P \cup \{0\}} \tilde{V}_j'\right)$ $\cdots\cdots\cdots\cdots\cdots\cdots\cdots\cdots\cdots$ Joint decryption $\cdots\cdots\cdots\cdots\cdots\cdots\cdots\cdots\cdots$ $T_C := \tilde{U}^{k_0}, \ T_0' := \tilde{U}'^{k_0}$ | $T_i := \tilde{U}^{k_i}, \ T_i' := \tilde{U}'^{k_i}$
$K_j := \prod_{\ell=0}^{t-1} \tilde{K}_\ell^{j^\ell}, \ \forall j \in P$ | $K_i := G^{k_i}, \ K_j := \prod_{\ell=0}^{t-1} \tilde{K}_\ell^{j^\ell}, \ \forall j \in P \setminus \{i\}$
$\pi_{3,0} \leftarrow \text{Prove}\left(\text{crs}, \begin{pmatrix} G & K_0 \\ \tilde{U} & T_0 \end{pmatrix}, k_0\right)$ | $\pi_{3,i} \leftarrow \text{Prove}\left(\text{crs}, \begin{pmatrix} G & K_i \\ \tilde{U} & T_i \end{pmatrix}, k_i\right)$
ensure $\forall j \in P : \text{Vf}\left(\text{crs}, \begin{pmatrix} G & K_j \\ \tilde{U} & T_j \end{pmatrix}, \pi_{3,j}\right)$ | $\xleftarrow{T_i, \pi_{3,i}, T_i', \pi_{3,i}'}$ $\pi_{3,i}' \leftarrow \text{Prove}\left(\text{crs}, \begin{pmatrix} G & K_i \\ \tilde{U}' & T_i' \end{pmatrix}, k_i\right)$
ensure $\forall j \in P : \text{Vf}\left(\text{crs}, \begin{pmatrix} C & K_j \\ \tilde{U}' & T_j' \end{pmatrix}, \pi_{3,j}'\right)$ | $\xrightarrow{\{(j, T_j, \pi_{3,j})\}_{j \in (P \cup \{0\}) \setminus \{i\}}}{\text{to } i \in P}$ $b_i := \left(\forall j \in P \setminus \{i\} : \text{Vf}\left(\text{crs}, \begin{pmatrix} G & K_j \\ \tilde{U} & T_j \end{pmatrix}, \pi_{3,j}\right)\right)$
$T := \prod_{j \in P \cup \{C\}} T_j^{\lambda_{P,j}}, \ T' := \prod_{j \in P \cup \{0\}} T_j'^{\lambda_{P,j}}$ | $T := \prod_{j \in P \cup \{0\}} T_j^{\lambda_{P,j}}$
if $(\tilde{V} \neq T)$ then return $\epsilon$ | if $(b_i = 1) \wedge (\tilde{V} \cdot T^{-1} = I)$ then return $\epsilon$
$M := (C_1 / (\tilde{V}' \cdot T'^{-1}))$ |
return $M$ | return $n$

Figure 8

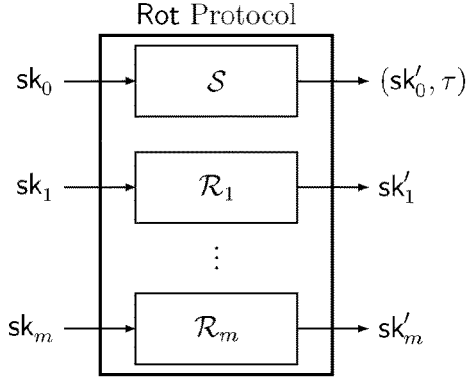

Figure 9

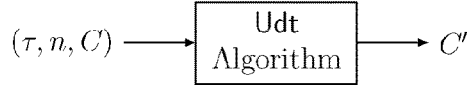

Figure 10

$\text{Rot}\langle \mathcal{S}(\text{"ROT"}, \text{sk}_0), \cdots \rangle$ $\gamma \leftarrow_\$ \mathbb{Z}_p^*,\ \beta_j, \delta_j \leftarrow_\$ \mathbb{Z}_p,\ \forall j \in [0, t-1]$ $\bar{\beta}(x) := \sum_{j=0}^{t-1} \bar{\beta}_j x^j,\ \bar{\delta}(x) := \sum_{j=0}^{t-1} \bar{\delta}_j x^j$ $\beta_i := \bar{\beta}(i),\ \delta_i := \bar{\delta}(i),\ \forall i \in [m]$ $s_0' := \text{SKE.KGen}(1^\lambda)$ $k_0' := \gamma \cdot k_0$ $K_0' := K_0^\gamma$ $\bar{S}_j' := \bar{S}_j \cdot G^{\bar{\beta}_j},\ \bar{K}_j' := \bar{K}_j^\gamma G^{\bar{\delta}_j},\ \forall j \in \{0, \ldots, t-1\}$ send $(\beta_i, \gamma, \delta_i, \{\bar{S}_j', \bar{K}_j'\}_{j=0}^{t-1})$ to $\mathcal{R}_i,\ \forall i \in [m]$ $\text{sk}_0' \leftarrow (s_0', k_0', K_0', \{\bar{S}_j', \bar{K}_j'\}_{j=0}^{t-1}),\ \tau := (s_0, s_0', \bar{\beta}_0)$ return $(\text{sk}_0', \tau)$ $\text{Rot}\langle \cdots, \mathcal{R}_i(\text{"ROT"}, \text{sk}_i), \cdots \rangle$ receive $(\beta_i, \gamma, \delta_i, \{\bar{S}_j', \bar{K}_j'\}_{j=0}^{t-1})$ from $\mathcal{S}$ ensure $\gamma \neq 0$ $s_i' := s_i + \beta_i$ $k_i' := \gamma \cdot k_i + \delta_i$ $K_0' := K_0^\gamma$ $\text{sk}_i' := (s_i', k_i', K_0', \{\bar{S}_j', \bar{K}_j'\}_{j=0}^{t-1})$ ensure $\text{KVf}(i, \text{sk}_i')$ return $\text{sk}_i'$ $\underline{\text{Udt}(\tau, n, C)}$ parse $\tau$ as $(\tilde{s}_0, \bar{\beta}_0)$ parse $\text{SKE.Dec}(\tilde{s}_0, C)$ as $(C_0, C_1)$ $C_0' := C_0 \cdot H_0(n)^{\bar{\beta}_0},\ C_1' := C_1 \cdot H_1(n)^{\bar{\beta}_0}$ return $C' := \text{SKE.Enc}(s_0, (C_0', C_1'))$ $\underline{\text{KVf}(i, \text{sk}_i)}$ if $i = 0$ then return $(G^{k_0} = K_0)$ else return $(G^{s_i} = \prod_{j=0}^{t-1} \bar{S}_j^{i^j} \wedge G^{k_i} = \prod_{j=0}^{t-1} \bar{K}_j^{i^j})$

Figure 11

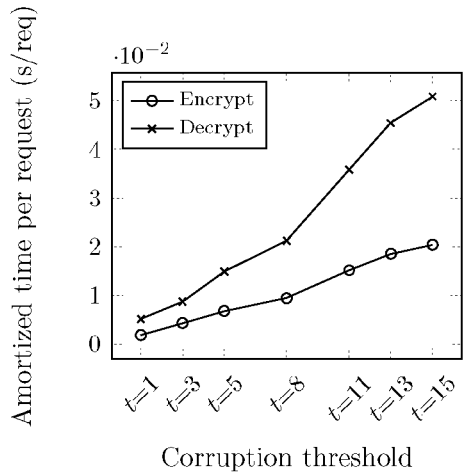

Figure 12

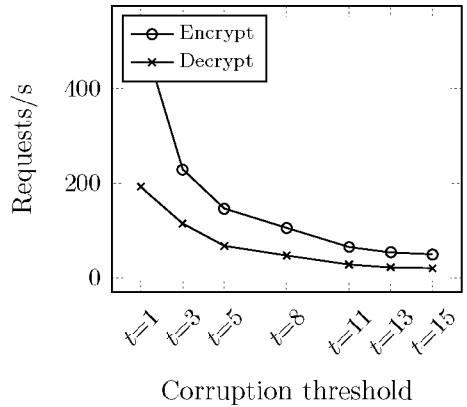

Figure 13

| Prove(crs, $x$, $w$) | Vf(crs, $x$, $\pi$) |
|---|---|
| parse $x$ as $\begin{pmatrix} A_{1,1} & \ldots & A_{1,n} & B_1 \\ \vdots & \ddots & \vdots & \vdots \\ A_{m,1} & \ldots & A_{m,n} & B_m \end{pmatrix}$ | parse $x$ as $\begin{pmatrix} A_{1,1} & \ldots & A_{1,n} & B_1 \\ \vdots & \ddots & \vdots & \vdots \\ A_{m,1} & \ldots & A_{m,n} & B_m \end{pmatrix}$ |
| parse $w$ as $(x_1, \ldots, x_n)$ | parse $\pi$ as $(R_1, \ldots, R_m, y_1, \ldots, y_n)$ |
| $(r_1, \ldots, r_n) \leftarrow_\$ \mathbb{Z}_p$ | $c := H(\text{crs}, x, R_1, \ldots, R_m)$ |
| $R_i := \prod_{j=1}^n A_{i,j}^{r_j}, \ \forall i \in [m]$ | $b := (\forall i \in [m], \ \prod_{j=1}^n A_{i,j}^{y_j} = B_i^c \cdot R_i)$ |
| $c := H(\text{crs}, x, R_1, \ldots, R_m)$ | return $b$ |
| $(y_1, \ldots, y_n) := c \cdot (x_1, \ldots, x_n) + (r_1, \ldots, r_n)$ | |
| return $(R_1, \ldots, R_m, y_1, \ldots, y_n)$ | |

Figure 14

$\text{Hid}^b_{\Pi, \mathcal{A}, Q_{\text{Dec}}, \mathcal{PW}}(1^\lambda, 1^m, 1^t, I)$ 1: ensure $|I \cap [m]| < t \vee 0 \notin I$
2: $\text{IsChallenged} := 0$, $\tau := \epsilon$, $\text{DecCount} := 0$
3: $\text{CorruptParties} := I$
4: $(\text{sk}_0, \ldots, \text{sk}_m) \leftarrow \text{Setup}(1^\lambda, 1^m, 1^t)$
5: $\mathbb{O} := \{\text{Enc}\mathcal{O}, \text{Dec}\mathcal{O}, \text{Corr}\mathcal{O}, \text{Rot}\mathcal{O},$
6: $\quad \text{Udt}\mathcal{O}, \text{Ch}\mathcal{O}_b, \text{DecCh}\mathcal{O}\}$
7: $b' \leftarrow \mathcal{A}^\mathbb{O}(1^\lambda, \{\text{sk}_i\}_{i \in I})$
8: if $\text{DecCount} \geq Q_{\text{Dec}}$ then $b' \leftarrow_\$ \{0,1\}$
9: return $b'$ $\text{Enc}\mathcal{O}(\text{pw}, M, I, \{\mathcal{P}_i\}_{i \in I})$ 1: ensure $I \subseteq \text{CorruptParties}$
2: $\mathcal{S}^* := $ if $0 \in I$ then $\mathcal{P}_0^\mathbb{O}$ else $:= \mathcal{S}(\text{"ENC"}, \text{sk}_0, \text{pw}, M)$
3: $\mathcal{R}_i^* := $ if $i \in I$ then $\mathcal{P}_i^\mathbb{O}$ else $\mathcal{R}_i(\text{"ENC"}, \text{sk}_i)$ $\forall i \in [m]$
4: $((n, C; \text{view}_0), (*; \text{view}_1), \ldots, (*; \text{view}_m)) \leftarrow \langle \mathcal{S}^*, \mathcal{R}_1^*, \ldots, \mathcal{R}_m^* \rangle$
5: return $(n, C, \text{view}_I)$ $\text{Dec}\mathcal{O}(\text{pw}, n_0, C, I, \{\mathcal{P}_i\}_{i \in I})$ 1: ensure $I \subseteq \text{CorruptParties}$
2: $\mathcal{S}^* := $ if $0 \in I$ then $\mathcal{P}_0^\mathbb{O}$ else $:= \mathcal{S}(\text{"DEC"}, \text{sk}_0, \text{pw}, n_0, C)$
3: $\mathcal{R}_i^* := $ if $i \in I$ then $\mathcal{P}_i^\mathbb{O}$ else $\mathcal{R}_i(\text{"DEC"}, \text{sk}_i, n)$ $\forall i \in [m]$
4: $((M; \text{view}_0), (n_1; \text{view}_1), \ldots, (n_m; \text{view}_m)) \leftarrow \langle \mathcal{S}^*, \mathcal{R}_1^*, \ldots, \mathcal{R}_m^* \rangle$
5: $b_0 := (0 \in I \vee n_0 = n^*)$
6: $b_1 := (|I \cap [m]| + |\{i : n_i = n^*\}| \geq t)$
7: if $b_0 \wedge b_1$ then $\text{DecCount} := \text{DecCount} + 1$
8: return $(M, \text{view}_I)$ $\text{DecCh}\mathcal{O}(C, I, \{\mathcal{P}_i\}_{i \in I})$ 1: ensure $\text{IsChallenged} = 1 \wedge I \subseteq \text{CorruptParties} \setminus \{0\}$
2: $\mathcal{S}^* := \mathcal{S}(\text{"DEC"}, \text{sk}_0, \text{pw}^*, n^*, C)$
3: $\mathcal{R}_i^* := $ if $i \in I$ then $\mathcal{P}_i^\mathbb{O}$ else $\mathcal{R}_i(\text{"DEC"}, \text{sk}_i, n)$ $\forall i \in [m]$
4: $((*; \text{view}_0), \ldots, (*; \text{view}_m)) \leftarrow \langle \mathcal{S}^*, \mathcal{R}_1^*, \ldots, \mathcal{R}_m^* \rangle$
5: return $\text{view}_I$ $\text{Rot}\mathcal{O}(\text{HonestRot}, I, \{\mathcal{P}_i\}_{i \in I})$ 1: if $\text{HonestRot} = 1$ then // Honest rotation then corruption
2: $\quad$ ensure $|I \cap [m]| < t \vee 0 \notin I$
3: $\quad \mathcal{S}^* := \mathcal{S}(\text{"ROT"}, \text{sk}_0)$
4: $\quad \mathcal{R}_i^* := \mathcal{R}_i(\text{"ROT"}, \text{sk}_i)$ $\forall i \in [m]$
5: $\quad ((\text{sk}_0, \tau), \text{sk}_1, \ldots, \text{sk}_m) \leftarrow \langle \mathcal{S}^*, \mathcal{R}_1^*, \ldots, \mathcal{R}_m^* \rangle$
6: $\quad \text{CorruptParties} := I$
7: $\quad$ return $\{\text{sk}_i\}_{i \in I}$
8: else // Malicious rotation
9: $\quad$ ensure $I \subseteq \text{CorruptParties}$
10: $\quad \mathcal{S}^* := $ if $0 \in I$ then $\mathcal{P}_0^\mathbb{O}$ else $\mathcal{S}(\text{"ROT"}, \text{sk}_0)$
11: $\quad \mathcal{R}_i^* := $ if $i \in I$ then $\mathcal{P}_i^\mathbb{O}$ else $\mathcal{R}_i(\text{"ROT"}, \text{sk}_i)$ $\forall i \in [m]$
12: $\quad ((\text{sk}_0, \tau; \text{view}_0), (\text{sk}_1; \text{view}_1), \ldots, (\text{sk}_m; \text{view}_m)) \leftarrow$
13: $\quad \quad \langle \mathcal{S}^*, \mathcal{R}_1^*, \ldots, \mathcal{R}_m^* \rangle$
14: $\quad$ return $\text{view}_I$
15: endif

$\text{Corr}\mathcal{O}(i)$

1: $\text{CorruptParties}' := \text{CorruptParties} \cup \{i\}$
2: ensure $|\text{CorruptParties}' \cap [m]| < t \vee 0 \notin \text{CorruptParties}'$
3: $\text{CorruptParties} := \text{CorruptParties}'$
4: return $\text{sk}_i$ $\text{Udt}\mathcal{O}(n, C)$ 1: ensure $\tau \neq \epsilon$
2: $C' \leftarrow \text{Udt}(\tau, n, C)$
3: return $C'$ $\text{Ch}\mathcal{O}_b(M_0^*, M_1^*, I, \{\mathcal{P}_i\}_{i \in I})$ 1: ensure $\text{IsChallenged} = 0 \wedge I \subseteq \text{CorruptParties} \setminus \{0\}$
2: $\text{IsChallenged} := 1$, $\text{pw}^* \leftarrow_\$ \mathcal{PW}$
3: $\mathcal{S}^* := \mathcal{S}(\text{"ENC"}, \text{sk}_0, \text{pw}^*, M_b^*)$
4: $\mathcal{R}_i^* := $ if $i \in I$ then $\mathcal{P}_i^\mathbb{O}$ else $\mathcal{R}_i(\text{"ENC"}, \text{sk}_i)$ $\forall i \in [m]$
5: $((n^*, C^*), (*; \text{view}_1), \ldots, (*; \text{view}_m)) \leftarrow \langle \mathcal{S}^*, \mathcal{R}_1^*, \ldots, \mathcal{R}_m^* \rangle$
6: return $(n^*, C^*, \text{view}_I)$

Figure 15

$\underline{\text{Soundness}_{\Pi,\mathcal{A}}(1^\lambda)}$

1: Queries := $\emptyset$
2: $\mathbb{O} := \{\text{Enc}\mathcal{O}, \text{Dec}\mathcal{O}\}$
3: $(i,j) \leftarrow \mathcal{A}^{\mathbb{O}}(1^\lambda)$
4: $(\text{sk}_0, n, C, \text{pw}, M) := \text{Queries}[i]$
5: $(\text{sk}'_0, n', C', \text{pw}', M') := \text{Queries}[j]$
6: $b_0 := -((\text{sk}_0, C) - (\text{sk}'_0, C'))$
7: $b_1 := (M \neq \bot \wedge M' \neq \bot)$
8: $b_2 := (((n, \text{pw}) = (n', \text{pw}')) \wedge (M \neq M'))$
9: $b_3 := (((n, \text{pw}) \neq (n', \text{pw}')) \wedge (M, M' \in \mathcal{M}))$
10: return $b_0 \wedge b_1 \wedge (b_2 \vee b_3)$ $\underline{\text{Enc}\mathcal{O}(\text{sk}_0, \text{pw}, M, r, m, \tilde{\mathcal{R}}_1, \ldots, \tilde{\mathcal{R}}_m)}$ 1: $((n, C), *, \ldots, *) \leftarrow \langle \mathcal{S}(\text{``ENC''}, \text{sk}_0, \text{pw}, M; r), \tilde{\mathcal{R}}_1^{\mathbb{O}}, \ldots, \tilde{\mathcal{R}}_m^{\mathbb{O}} \rangle$
2: Queries := Queries $\cup \{(\text{sk}_0, n, C, \text{pw}, M)\}$
3: return $\epsilon$ $\underline{\text{Dec}\mathcal{O}(\text{sk}_0, \text{pw}, n, C, r, m, \tilde{\mathcal{R}}_1, \ldots, \tilde{\mathcal{R}}_m)}$ 1: $(M, *, \ldots, *) \leftarrow \langle \mathcal{S}(\text{``DEC''}, \text{sk}_0, \text{pw}, n, C; r), \tilde{\mathcal{R}}_1^{\mathbb{O}}, \ldots, \tilde{\mathcal{R}}_m^{\mathbb{O}} \rangle$
2: Queries := Queries $\cup \{(\text{sk}_0, n, C, \text{pw}, M)\}$
3: return $\epsilon$

Figure 16

METHODS FOR THRESHOLD PASSWORD-HARDENED ENCRYPTION AND DECRYPTION

CROSS REFERENCE TO RELATED APPLICATION:

The present application takes priority from European Patent Application No. 20167386.0, filed on Mar. 31, 2020, the contents of which are incorporated herein by reference.

The present invention relates to encrypting and decrypting data, and more particularly to computer-implemented methods for encrypting and decrypting user data by a server in cooperation with a set of rate-limiters.

BACKGROUND OF THE INVENTION

An increasing amount of sensitive information is collected, processed, and made accessible by online services. In the classic authenticate-then-decrypt mechanism, an end-user is first authenticated by means of a password, followed by the retrieval of the user data, which is typically encrypted under a static server secret key, or sometimes even stored in plain. This classic approach is proven to be ineffective to prevent data breaches, especially against insider attackers that have full control of (the server hosting) the database. Not only can the attacker guess the passwords of individual users using offline brute-force attacks, it can also directly learn the master key and hence all user data. Lai et al. [LER+18] introduced password-hardened encryption (PHE) to strengthen the security of the authenticate-then-decrypt mechanism. Inherited from the notion of password-hardening [LESC17], PHE involves an external party in addition to the server, known as the rate-limiter, who only assists in the computation obliviously. PHE allows the server to derive a data key that depends on the password of the user, the server key, and the rate-limiter key, while the rate-limiter remains oblivious to the password and the data key.

Thus, the core idea is to introduce an external crypto service, the rate-limiter, that supports the encryption and decryption of data on the server without getting access to them. Since interaction with the rate-limiter is needed, offline brute-force attacks are no longer possible, and online attacks can be rate-limited.

Intuitively, the security of PHE states that, neither the server nor the rate-limiter alone should learn anything about the encoded password and the data key without cooperating with each other. To recover the data key, a corrupt party must communicate with the other party, who rate-limits decryption attempts. Finally, PHE supports key-rotation, which allows to rotate the keys of the server and rate-limiter with succinct communication. Thereafter, the server can locally update all ciphertexts without further interaction with the rate-limiter or end users. This property of key-rotation is demanded by the payment card industry data security standard (PCI DSS) [PCI16].

While PHE significantly improves security, it also introduces availability and trust issues due to the introduction of an external rate-limiter. If the rate-limiter is unreachable, e.g., due to network failure or malicious attacks, the data would become unavailable to the end users as the server cannot provide decryption service alone. Even worse, if the rate-limiter key is lost, then all user data is effectively lost permanently. These potential issues may discourage service providers from deploying PHE, as they may not want to ultimately depend on third parties for emergency access to their data. The naïve solution of duplicating the rate-limiter into multiple instances increases availability, but at a cost of security. If any one of the instances of the rate-limiter is corrupt, any benefit brought by PHE would be nullified.

SUMMARY OF INVENTION

Therefore, the object of the present invention is to provide methods for encrypting and for decrypting user data which at least alleviate the drawbacks mentioned above.

This object is solved by the method according to the independent claims. Advantageous embodiments are defined in the respective dependent claims.

Thus, the invention provides a computer-implemented method for encrypting data by a server in cooperation with a predetermined number of rate-limiters,
the predetermined number being greater than 1,
each of the rate-limiters being a respective processing unit different from each other and from the server, and having a respective secret key, $sk_1, \ldots, sk_i, \ldots, sk_m$,
the server having a predetermined secret key, $sk_0$,
the method comprising:
receiving, by the server, from the user, a user identification, un, a password, pw, to be encrypted,
creating, by the server, a secret message, M,
the secret message, M, being a key suitable for use with a predetermined symmetric key encryption scheme,
generating, by the server in cooperation with a subset, P, of a size t', which is equal to or greater than a predetermined threshold, t, out of the predetermined number, m, of rate-limiters, on the basis of a predetermined interactive cryptographic encryption protocol, a ciphertext, C, which encrypts the user password, pw, and the secret message, M, using their respective secret keys of the rate-limiters of the subset, the threshold, t, being smaller than or equal to the predetermined number, m, of rate-limiters, and
the predetermined interactive cryptographic protocol being adapted such that the server needs only to interact with a subset, P, of the predetermined size, t, of the predetermined number, m, of rate-limiters for decryption of the ciphertext to recover the secret message, storing, by the server, the ciphertext, C, in association with the user identification, un, and
deleting the secret message, M, and the password, pw.

Advantageous embodiments of the invention include the following features.

The method may further comprise:
generating, by the server, a server nonce, $n_0$, on the basis of a predetermined random process,
receiving, by the server, a predetermined number of rate-limiter nonces, $n_1, \ldots, n_i, \ldots, n_m$, each rate-limiter nonce, $n_i$, created by a respective rate-limiter on a basis of a random operation,
making known the nonces to the predetermined number, m, of rate-limiters, using the nonces for generating the ciphertext, C.

Hereby, the ciphertext, C, may be a tuple, $C_0, C_1$, encrypted with a predetermined symmetric encryption key which is a part of the server secret key,
the tuple being computed as $$C_0 = H_0(pw, n) \cdot H_0(n)^{\bar{s}_0}$$

$$C_1 = H_1(pw, n) \cdot H_1(n)^{\bar{s}_0} \cdot M$$

wherein: $H_0, H_1$ representing independent Hash functions, $\bar{s}_0$ is part of a conceptual rate-limiter key which is secret-shared to the predetermined number of rate-limiters on the basis of a predetermined linear secret sharing scheme with a reconstruction threshold equal to the subset wherein for a given subset of rate-limiters, there exists a public linear combination such that $s_0 = \Sigma_{j=1}^{t} \lambda_j s_{i_j}$ holds,
with
t denoting the number of rate-limiters of the subset; λ being a predetermined security parameter.

Hereby, for any subset of the number of rate-limiters $H_0$, $H_1$ may be expressed as $$H_0(n)^{s_0} = H_0(n)^{\Sigma_{i \in P} \lambda_{P,i} s_i}$$

$$H_1(n)^{s_0} = H_1(n)^{\Sigma_{i \in P} \lambda_{P,i} s_i}$$

The method may further comprise:
receiving, by the server, from the user, along with receiving the user identification, un, and the oasswird, pw, useer data, ud, to be encrypted,
encrypting, by the server, the user data, ud, by applying the predetermined symmetric key encryption scheme using the secret message. M, as encryption key, and
storing, by the server, the encrypted user data, ud.

According to the invention further provided is a computer-implemented method for decrypting user data, ud, by a server, in cooperation with a predetermined number of rate-limiters, the user data, ud, being encrypted by the method as described above, the decrypting method comprising:
Receiving, by the server, from the user a user identification, un, and the password, pw,
retrieving, by the server, the ciphertext, C, and the encrypted user data stored in association with the uder identification, un,
recovering the secret message, M, by decrypting, by the server with its secret key, $sk_0$, in cooperation with a subset, P, of a size, t', which is equal to or greater than the predetermined threshold, t, out of the predetermined number, m, of rate-limiters with their respective secret keys, $sk_i$, the ciphertext, C, and
deleting, by the server, the secret message, M, and the user password, pw.

The decryption method may further comprise:
Sending, by the server, the secret to the subset P' of rate-limiters,
computing, by the server, the value $Y_{0,0} := C_0 \cdot H_0(pw, n)^{-1}$,
initiating the i-th rate-limiter of the subset of rate-limiters to compute the value $Y_{i,0} := H_0(n)^{s_i}$,
checking if $Y_{0,0} = \Pi_{i \in P} Y_{i,0}^{\lambda_{P,i}}$ for some t-subset P of [m] by the server and the subset P of rate-limiters performing the steps of:
step a) computing the encryption of the value $$Z := Y_{0,0}^{-1} \Pi_{i \in P} Y_{i,0}^{\lambda_{P,i}}$$

with the K being a public key, and $K = K_0 \cdot \bar{K}_0$, and a corresponding secret key being secret-shared among the server and the subset of rate-limiters,
step b) computing an encryption of the values encryption of $Z^{\tilde{r}}$ and $Z^{\tilde{r}'} \cdot H_1(n)^{s_0}$ for random $\tilde{r}$ and $\tilde{r}'$, respectively,
step c) checking whether $Z^{\tilde{r}} = I$, and if so, obtaining $H_1(n)^{s_0}$ by decrypting the ciphertext C
I being an identity element,
and recovering the message M therefrom.

Hereby, each rate-limiter may associate a counter with the user identification, and may increment the counter if the verification step fails due to a received incorrect password, may abort the current decryption session, and may block further receiving user identification and password for a predetermined time of at least the user to which a the counter is associated.

As an alternative, each rate-limiter may implement a counter, and may increment the counter if the verification step fails due to a received incorrect password, un, may abort the current decryption session, and may blocking further receiving user identification and password for a predetermined time.

The encryption method may further comprise:
Running, by the server, prior to creating the secret message, M, a setup algorithm comprising:
defining the threshold, and the number m, of rate-limiters, generating the server secret key, $sk_0$, and
generating for each rate-limiter of the predetermined number, m, of rate-limiters the respective secret key, $sk_i$, such that from each secret key, $sk_0, \ldots, sk_m$, the size, t, of the subset, P, of rate-limiters, and the predetermined number, m, of rate limiters can be derived.

Hereby, the setup algorithm may further comprise:
Running a group generation algorithm which maps the security parameter to the description of a cyclic group of prime order q with generator G, each of the the secret keys has the format
$sk_i$ having the format $(s_i, k_i, S_0, K_0, \{\bar{S}_j, \bar{K}_j\}_{j=0}^{t-1})$ where $s_0$ is a secret key for a symmetric key encryption scheme SKE and satisfying the following properties:

$$G^{s_i} = \prod_{j=0}^{t-1} \bar{S}_j^{i^j}, i \in [m]$$

$$G^{k_i} = \begin{cases} K_0 & i = 0 \\ \prod_{j=0}^{t-1} \bar{K}_j^{i^j} & i \in [m]. \end{cases}$$

Hereby, verifying the validity of the secret keys may be performed by applying the following scheme:
if i=0 then return $(G^{k_0} = K_0)$
else return $(G^{s_i} = \Pi_{j=0}^{t-1} \bar{S}_j^{i^j} \wedge G^{k_i} = \Pi_{j=0}^{t-1} \bar{K}_j^{i^j})$ The methods described above may further comprise:
Initiated by the server at least one rate-limiter out of the predetermined number of rate-limiters to perform, a rotation of the secret keys according to a predetermined key rotation protocol, and
performing, by the server, an algorithm for updating the ciphertext to an updated ciphertext with keys produced in the key rotation protocol.

Herein, the key rotation protocol may comprise:
Initiating a rate-limiter of the predetermined number of rate-limiters to request at least a part of the predetermined number of rate-limiters to perform a respective key rotation, and
receiving confirmation of the requested rate-limiters about key rotation.

The key rotation protocol may further comprise:
Requesting, by the server or initiating a rate-limiter of the predeter-mined number of rate-limiters, a part of the predetermined number of rate-limiters to perform a respective key rotation, to obtain updated secret keys,
deriving an update token for updating the ciphertext.

In particular, the key rotation may comprise:
Updating $$sk_i = (s_i, k_i, S_0, K_0, \{\bar{S}_j, \bar{K}_j\}_{j=0}^{t-1})$$

to $$sk'_i = (s'_i, k'_i, S'_0, K'_0, \{\bar{S}'_j, \bar{K}'_j\}_{j=0}^{t-1})$$

where $s'_0$ is a new secret encryption secret key for SKE, and the following properties hold:

$$K'_0 = K_0^\gamma = G^{k'_0}$$

$$\forall j \in [0, t-1] \quad \overline{S}'_j = \overline{S}_j G^{\overline{\beta}_j}$$

$$\forall j \in [0, t-1] \quad \overline{K}'_j = \overline{K}'_j G^{\overline{\delta}_j}$$

$$\forall i \in [m] \quad G^{s'_i} = \prod_{j=0}^{t} \overline{S}'^{i^j}_j$$

$$\forall i \in [m] \quad G^{k'_i} = \prod_{j=0}^{t} \overline{K}'^{i^j}_j$$

for $\overline{\beta}_0, \ldots, \overline{\beta}_{t-1}, \gamma, \overline{\delta}_0, \ldots, \overline{\delta}_{t-1}$ being random integers sampled by the server, and the update token being defined as $(s_0, s'_0, \overline{\beta}_0)$, and a nonce n, updating the ciphertext C to the updated ciphertext C' such that the updated ciphertext C' is given by encrypting the tuple $(C'_0, C'_1)$ with the new symmetric encryption key $s'_0$ where $C'_0 := C_0 \cdot H_0(n)^{\overline{\beta}_0}$ and $C'_1 := C_1 \cdot H_1(n)^{\overline{\beta}_0}$, and n being a nonce produced by the server.

Herein, the subset of the prede-termined number of rate-limiters may be selected according to a predetermined access criterion.

The decryption method may further comprise:
decrypting, by the server, the encrypted user data, ud, by applying the predetermined user data symmetric key encryption/decryption scheme using the secret message M as decryption key.

Still further, the invention comprises software, which when loaded in a computer, controls the computer to implement the inventive methods as described above and as described in the detailed description.

Still further, the invention comprises a computer-readable storage medium which contains instructions, which when loaded in a computer, control the computer so as to implement the inventive methods as described above and as described in the detailed description.

Thus, the invention addresses the availability and trust issues of PHE by introducing threshold password-hardened encryption ((t, m)-PHE). The basic idea is to spread the responsibility of a single rate-limiter to m rate-limiters, such that a threshold number t of them are necessary and sufficient for successful en/decryption. As long as the adversary does not control both the server and at least t rate-limiters, the (t, m)-PHE schemes according to the invention provide the same security guarantees like those of PHE schemes. Practically speaking, this allows services to make use of rate-limiters hosted by different providers, or even have some of them "in cold storage" locally where they can be reactivated in emergency situations to avoid data loss. Additionally, this allows strengthening security by requiring more than one honest rate-limiter for successful decryption.

DETAILED DESCRIPTION

Figure 2:
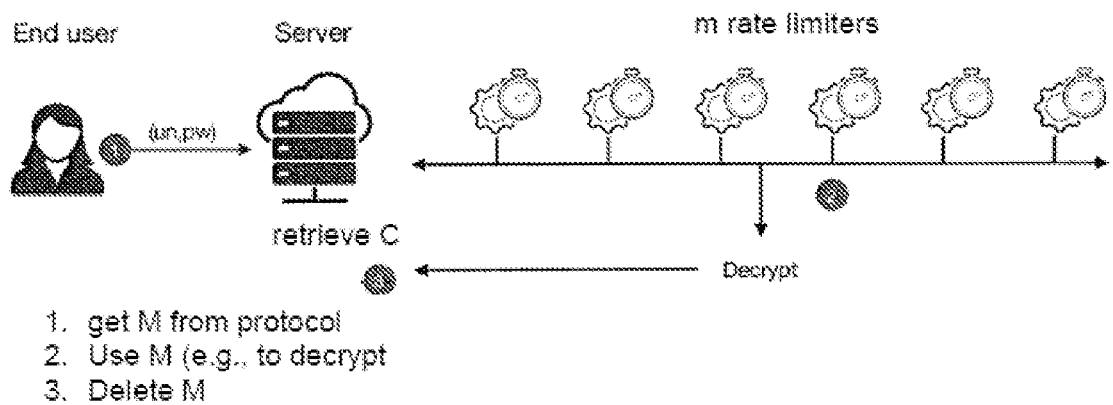
Figure 3:
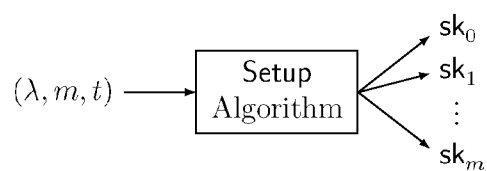
Figure 7:
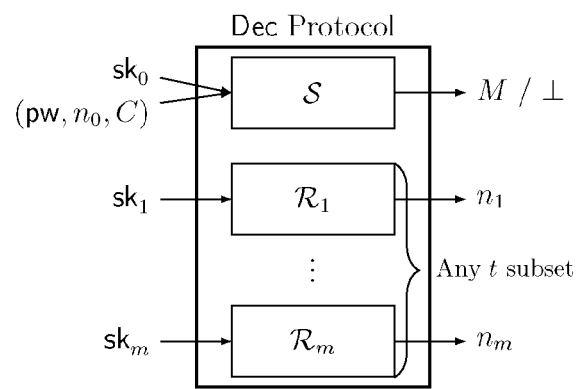

The invention and embodiments thereof will be described in connection with the drawings, wherein FIG. 1 illustrates graphically the encryption procedure according to the invention, FIG. 2 illustrates graphically the decryption procedure according to the invention, FIG. 3 illustrates a block diagram of the setup algorithm, FIG. 4 illustrates the setup protocol of the construction, FIG. 5 illustrates a block diagram of the encryption protocol according to the invention, FIG. 6 illustrates the encryption protocol of the construction, FIG. 7 illustrates a block diagram of the decryption protocol according to the invention, FIG. 8 illustrates the decryption protocol of the construction, FIG. 9 illustrates a block diagram of the key rotation protocol according to the invention, FIG. 10 illustrates a block diagram of the ciphertext update protocol according to the invention, FIG. 11 illustrates the key-rotation protocol, the update algorithm, and key verification algorithm of the construction, FIG. 12 illustrates the inverse of the throughput (i.e., amortized time per encryption or decryption request) of an implementation of the construction against the threshold of t, FIG. 13 illustrates the throughput (i.e., the encryption and decryption requests per second) of an implementation of against the threshold of t, FIG. 14 illustrates a non-interactive zero-knowledge proof of knowledge, FIG. 15 illustrates the security experiment for the hiding property, and FIG. 16 illustrates the security experiment for the soundness property.

OVERVIEW

An efficient (t, m)-PHE scheme based on standard cryptographic assumptions in the random oracle model is presented. Conceptually, the construction according to the invention is obtained by emulating the PHE scheme of Lai et al. [LER+18] using secure multi-party computation (MPC) protocols. Although using generic MPC protocols suffices for security, expressing the group operations used in [LER+18] as Boolean or arithmetic circuits would incur significant overhead. Moreover, since the scheme of Lai et al. [LER+18] is only proven secure in the random oracle model, emulating their scheme over an MPC would require instantiating the random oracles. Consequently, it is unlikely to obtain a security proof based on standard assumptions even in the random oracle model.

The above difficulty is overcome here by designing special-purpose MPC protocols, which exploit the linearity of the Shamir secret sharing scheme [Sha79] and the ElGamal encryption scheme [ElG84]. Since latency is the main bottleneck of PHE [LER+18], the main objective of the design is to minimize the round complexity, while restricting ourselves to only use relatively lightweight cryptographic tools. Assuming a communication model where the rate-limiters are not allowed to communicate with each other, the resulting encryption protocol consists of 3 rounds, while the decryption protocol consists of 6 rounds (7 rounds for "fine-grained" rate-limiting, see below under "Construction of the encryption/decryption scheme of the invention". It is believed that this is a good trade-off between round complexity and computational complexity. A side benefit of the inventive construction is that the rate-limiters cannot tell whether the same incorrect password was used in two failed decryption attempts of the same user.

It will be shown that the inventive construction is secure under the DDH assumption in the random oracle model, assuming static corruption, where the adversary must declare the set of corrupt parties for the next time epoch when instructing a key-rotation. Note that security under static corruption is already stronger than the security defined in [LER+18], where the corrupt party is fixed for the entire duration of the experiments. Nevertheless, we believe that security under adaptive corruption can be achieved under standard (yet not necessarily efficient) techniques. Since our primary focus is practical efficiency, we will not discuss adaptive corruption further.

Implementation and Evaluation.

Further, a prototype implementation in Python is provided and evaluated with respect to the latency and throughput of (t, m)-PHE for multiple threshold levels t. The experimental evaluation (see below) shows that, despite the increased computation and communication complexities when compared to PHE [LER+18], our (t, m)-PHE scheme is still within the practical realm for a reasonably small threshold t (e.g., 3).

Related Work

The original concept of password-hardening (PH) is due to Facebook [Muf15]. Everspaugh et al. [ECS+15] made the first step towards formalizing PH and identified key-rotation as the key property to make such schemes useful in practice, which is also the key challenge when designing PH and PHE schemes. The notion of PH has been subsequently refined by Schneider et al. [SFSB16] and Lai et al. [LESC17]. In addition to password verification, Lai et al. [LER+18] later introduced the concept of password-hardened encryption (PHE) that allows associated data to be encrypted under a per-user key that is inaccessible without the user's password and provides strong security guarantees analogous to those of PH.

The construction of (t, m)-PHE in this work is based on the PHE scheme in [LER+18], which in turn is based on the PH scheme in [LESC17]. As observed in [LER+18], it is unclear how the PH scheme in [ECS+15] (formalized as a partially oblivious pseudorandom function) can be extended to a PHE scheme. Therefore, although the scheme in [ECS+15] has a natural threshold variant, it is not helpful for constructing (t, m)-PHE schemes.

A closely related notion is password-protected secret sharing (PPSS) [BJSL11], which provides similar functionality as that of (t, m)-PHE, with different formulations in syntax and security definitions. The key feature separating (t, m)-PHE from PPSS is key-rotation. Indeed, a (t, m)-PHE can be seen as a PPSS scheme with key-rotation.

Password-based threshold authentication (PbTA) [AMMM18] is a recent related notion where, instead of recovering a data key, the goal is to produce an authentication token which can be verified by the service provider. Moreover, the PbTA scheme in [AMMM18] does not support key-rotation.

Definitions

Let $1^\lambda$ be the security parameter and $m \in \mathbb{N}$. The set $\{1, \ldots, m\}$ is denoted by $[m]$, and the set $\{a, a+1, \ldots, b\}$ is denoted by $[a, b]$. We denote by $$((y_1; \text{view}_1), \ldots, (y_m; \text{view}_m)) \leftarrow \Pi \langle \mathcal{P}_1(x_1; r_1), \ldots, \mathcal{P}_m(x_m; r_m) \rangle$$

the protocol $\Pi$ between the interactive algorithms $\mathcal{P}_1, \ldots, \mathcal{P}_m$, where $\mathcal{P}_i$ has input $x_i$, randomness $r_i$, output $y_i$, and view $\text{view}_i$. The view $\text{view}_i$ consists of the input $x_i$, the input randomness $r_i$, and all messages received by $\mathcal{P}_i$ during the protocol execution. Let $I \subseteq [m]$. We use the shorthand view, to denote the set $\{(i, \text{view}_i)\}_{i \in I}$. In case that the output $\mathcal{P}_i$ is not explicitly needed, we write * instead of $y_i$. For ease of readability, we omit the randomness $r_i$ and/or the view $\text{view}_i$ of $\mathcal{P}_i$ if they are not explicitly needed. When the randomness $r_i$ is omitted, it means that $r_i$ is chosen uniformly from the appropriate domain. We use the special and distinct symbols $\epsilon$ and $\perp$ to denote the empty string and an error (e.g., protocol abortion), respectively. Unless specified, the symbols $\epsilon$ and $\perp$ are by default not a member of any set. Let b be a Boolean value. We use the shorthand "ensure b" to denote the procedure which outputs $\perp$ (prematurely) if $b \neq 1$. Let t, $m \in \mathbb{N}$ with $t \leq m$. Let $\mathcal{PW}$ and $\mathcal{W}$ be the password space and the message space, respectively. Let $\mathcal{S}$ and $\mathcal{R}_i$ refer to the server and the i-th rate-limiter respectively for $i \in [m]$.

A t-out-of-m threshold password-hardened encryption ((t, m)-PHE) scheme for $\mathcal{PW}$ and $\mathcal{M}$ consists of the efficient algorithms and protocols (Setup, Enc, Dec, Rot, Udt), which we define as follows:

$(crs, sk_0, \ldots, sk_m) \leftarrow \text{Setup}(1^\lambda, 1^m, 1^t)$:

The setup algorithm inputs the security parameter $1^\lambda$, the number of rate-limiters $1^m$, and the threshold $1^t$. It outputs the common reference string crs, the secret key $sk_0$ for the server and the secret key $sk_i$ for the i-th rate-limiter, for all $i \in [m]$. The common reference string is an implicit input to all other algorithms and protocols for all parties.

$$((n, C), \epsilon, \ldots, \epsilon) \leftarrow \text{Enc} \left\langle \begin{array}{c} \mathcal{S}(\text{``ENC''}, sk_0, pw, M), \\ \mathcal{R}_1(\text{``ENC''}, sk_1), \\ \ldots, \\ \mathcal{R}_m(\text{``ENC''}, sk_m) \end{array} \right\rangle :$$

The encryption protocol is run between the server and (possibly a subset of) the m rate-limiters. The server inputs its secret key, a password $pw \in \mathcal{PW}$, and a message $M \in \mathcal{M}$. The rate-limiters input their respective secret keys. The server outputs a nonce n and a ciphertext C, while each rate-limiter outputs an empty string $\epsilon$.

$$(M, n_1, \ldots, n_m) \leftarrow \text{Dec} \left\langle \begin{array}{c} \mathcal{S}(\text{``DEC''}, sk_0, pw, n_0, C), \\ \mathcal{R}_1(\text{``DEC''}, sk_1), \\ \ldots, \\ \mathcal{R}_m(\text{``DEC''}, sk_m) \end{array} \right\rangle :$$

The decryption protocol is run between the server and (possibly a subset of) the m rate-limiters. The server inputs its secret key, a candidate password $pw \in \mathcal{PW}$, a nonce $n_0$, and a ciphertext C. The rate-limiters input their respective secret keys. The server outputs a message M. Each rate-limiter outputs a nonce $n_i$ which can be interpreted as the identifier of the ciphertext C in the view of $\mathcal{R}_i$.

$$((sk'_0, \mathcal{T}), sk'_1, \ldots, sk'_m) \leftarrow \text{Rot} \left\langle \begin{array}{c} \mathcal{S}(\text{``ROT''}, sk_0), \\ \mathcal{R}_1(\text{``ROT''}, sk_1), \\ \ldots, \\ \mathcal{R}_m(\text{``ROT''}, sk_m) \end{array} \right\rangle :$$

The rotation protocol is run between the server and all m rate-limiters. Each party inputs its secret key and outputs a rotated key. The server additionally outputs an update token $\tau$.

$C' \leftarrow Udt(\tau, n, C)$:

The update algorithm inputs an update token $\tau$, a nonce n, and a ciphertext C. It outputs a new ciphertext C'.
Remarks.

Although in general it is undesirable to rely on trusted parties in cryptographic primitives, in a typical application of (t, m)-PHE it is acceptable to let the server run the setup algorithm, send the rate-limiter keys to the respective rate-limiters, and securely delete those keys. This is because it is for the server's own benefit to employ a (t, m)-PHE scheme in the first place. Moreover, the rate-limiters do not contribute any private inputs other than their secret keys in any protocols. If we insist that the server cannot be trusted to run the setup, a standard solution is to emulate the setup using a secure multi-party computation (MPC) protocol.

In an embodiment of the invention, the nonces are handled differently compared to the approach in previous work [LER+18]. The new approach models the reality more closely and is more intuitive. Previously, the encryption and decryption protocols take a "label" as common input for both the server and the rate-limiter, where the label consists of a server-side nonce and a rate-limiter-side nonce. This model deviates from the reality where the nonce is generated during (instead of before) the encryption protocol, stored by the server, and sent to the rate-limiter during decryption. More confusingly, the label input to the encryption protocol is by default an empty string, unless it is called in the forward security experiment.
Correctness.

Correctness is defined in the obvious way and the formal definition is omitted. Roughly speaking, a (t, m)-PHE is correct whenever all honestly generated ciphertexts can be successfully decrypted to recover the encrypted message with the correct password, at long as at least t rate-limiters participate in the decryption protocol. Moreover, if a ciphertext passes decryption with respect to some secret keys, then the updated ciphertext also passes decryption with respect to the rotated keys.
Security of (t, m)-PHE.

We define the hiding and soundness properties of (t, m)-PHE. As explained in the introduction, the former consolidates the hiding, obliviousness, and forward security properties of PHE, while the latter consolidates the soundness and strong soundness of PHE.
Communication Model.

To justify the assumption that not too many rate-limiters collude, most preferably the communication between each $\mathcal{R}_i$ and $\mathcal{S}$ is done via a secure authenticated channel. For $i \neq j$, there may not exist any communication channel between $\mathcal{R}_i$ and $\mathcal{R}_j$.
Construction of the Encryption/Decryption Scheme The construction of the (t, m)-PHE scheme according to the invention is based on the PHE scheme of [LER+18]. The basic idea is to emulate the rate-limiter in [LER+18] using multiple rate-limiters. Specifically, a conceptual rate-limiter secret key is secret-shared to multiple rate-limiters, and the latter are to run several multi-party computation (MPC) protocols to emulate the conceptual rate-limiter. Although generic MPC protocols suffice for security, special-purpose protocols are designed for concrete efficiency.

FIG. 1 illustrates the encryption procedure according to the invention.

The server, holding a key-pair with a public and private key pair, has access to m rate-limiters where each rate-limiter is an independent instance having its own public and private key pair. First, the user sends his user name (i.e., the user identification), un, and his password, pw, to the server. The server, upon receiving the user identification, un, and the password, pw, creates a secret message, M, and engages in an interactive cryptographic protocol with t' rate limiters out of the number m of rate-limiters, to generate, on the basis of an interactive cryptographic encryption protocol, a ciphertext, C, which encrypts the password, pw, and the message M, using the respective secret keys $sk_i$ of the t' rate-limiters. The message M is an encryption key suitable for use with a symmetric key encryption scheme.

The interactive cryptographic encryption protocol used herein is adapted such that the the server needs only to interact with a subset of the number m of rate-limiters for decrypting the the ciphertext, C, to recover the secret message M. This subset, P, has the size t.

The message M can then be used to encrypt (private) user data by the server, by using a symmetrical encryption/decryption scheme. After having encrypted the user data, the message M can be deleted.

FIG. 2 illustrates the procedure of decryption of the ciphertext C in order to recover the key M. Upon receiving the user name, un, and password, pw, from the user, the server tetrieves the ciphertext C and engages in an interactive cryptographic protocol with t out of the m rate-limiters to decrypt the ciphertext C. Thereby, the server obtains the key M, and can use it to decrypt the (private) user information. Thereafter, M can be deleted again.
Construction Overview Let $\mathbb{G}$ be a cyclic group of prime order p with generator G, and let $H_0, H_1: \{0,1\}^* \to \mathbb{G}$ be two independent hash functions modelled as random oracles. The structure of the ciphertexts in the scheme according to the invention is derived from [LER+18]: A ciphertext $C = \text{SKE.Enc}(s_0, (C_0, C_1))$ consists of a symmetric-key ciphertext of two group elements $C_0$ and $C_1$ under the server secret key component $s_0$, and is accompanied by a nonce n. The elements $C_0$ and $C_1$ have the format $$C_0 = H_0(pw, n) \cdot H_0(n)^{\bar{s}_0}$$

$$C_1 = H_1(pw, n) \cdot H_1(n)^{\bar{s}_0} \cdot M$$

where $\bar{s}_0$ is part of the conceptual rate-limiter secret key, and M is the encrypted message. The conceptual key $\bar{s}_0$ is secret-shared to m rate-limiters using the well-known Shamir secret sharing scheme with reconstruction threshold t. It should be noted that in general, any linear secret sharing scheme to support more expressive access policies can be used. A subtle simplification in our scheme compared to that of [LER+18] is that there is no distinction between the server nonce and the rate-limiter nonce. In our scheme, the nonce n is obtained via a coin-flipping protocol between the server and t rate-limiters. The server key is now used in a secret-key encryption scheme to allow for stronger security properties.

An important feature of the Shamir secret sharing scheme is that the reconstruction function is linear. That is, given a set of t shares and their indices $\{(i_j, s_{i_j})\}_{j=1}^t$, there exists a public linear combination with some coefficients $(\lambda_1, \ldots, \lambda_t)$ such that $\bar{s}_0 = \Sigma_{j=1}^t \lambda_j s_{i_j}$. This feature is crucial for the decryption protocol, as we will see.

Formal Description
Ingredients.

Given a finite set $\mathcal{P}$ of size $|\mathcal{P}| \geq t$, let $\text{Subset}_t(\mathcal{P})$ be an algorithm which returns an arbitrary size-t subset P of $\mathcal{P}$. Let $\text{GGen}:1^\lambda \mapsto (\mathbb{G}, p, G)$ be a group generation algorithm which maps the security parameter $1^\lambda$ to the description ($\mathbb{G}$, p, G) of a cyclic group $\mathbb{G}$ of prime order p with generator G. Let t, m $\in \mathbb{N}$ with $t \leq m \leq p$. For any subset $P \subseteq [m]$ and $i \in P$, recall the Lagrange polynomial $$l_{P,i}(x) := \prod_{j \in P \setminus \{i\}} \frac{x-j}{i-j}.$$

Let $\lambda_{P,i} := \ell_{P,i}(0)$. For the ease of notation, we define $\lambda_{P,0} := 1$ for all P. Let $H_0, H_1: \{0,1\}^* \to \mathbb{G}$ and $H:\{0,1\}^* \to \{0,1\}^\lambda$ be independent hash functions to be modeled as random oracles. Let SKE.(KGen, Enc, Dec) be a symmetric-key encryption scheme. Let (GGen, Prove, Vf) be a non-interactive zero-knowledge proof of knowledge (NIZKPoK) scheme for the relation $$R_{GDL} := \left\{ \begin{array}{l} (\mathbb{G}, G, p), \\ \begin{pmatrix} A_{1,1} & \cdots & A_{1,n} & B_1 \\ \vdots & \ddots & \vdots & \vdots \\ A_{m,1} & \cdots & A_{m,n} & B_m \end{pmatrix} \in \mathbb{G}^{m \times (n+1)}, \\ (x_1, \ldots, x_n) \in \mathbb{Z}_p : \\ \forall i \in [m], B_i = \prod_{j=1}^n A_{i,j}^{x_j} \end{array} \right\}$$

as described in the Appendix below.
Setup (Refer to FIG. 3 and FIG. 4).

The setup algorithm first runs GGen to generate the description of the group. It then generates the secret keys $sk_0, \ldots, sk_m$, where $sk_i$ has the format $(s_i, k_i, S_0, K_0, \{\overline{S}_j, \overline{K}_j\}_{j=0}^{t-1})$ where $s_0$ is a secret key for a symmetric key encryption scheme SKE and $$G^{s_i} = \prod_{j=0}^{t-1} \overline{S}_j^{i^j}, i \in [m]$$

$$G^{k_i} = \begin{cases} K_0 & i = 0 \\ \prod_{j=0}^{t-1} \overline{K}_j^{i^j} & i \in [m]. \end{cases}$$

Each party can verify the validity of their keys using the subroutine KVf defined in FIG. 11.
Encryption (Refer to FIG. 5 and to FIG. 6).

Preferably, the encryption protocol begins with a coin-flipping procedure. Each party samples some randomness $n_i$ and exchanges their randomness with each other. They then hash all randomness using the hash function H to create a nonce n. With the help of the rate-limiters, the server computes the tuple $(C_0, C_1) := (H_0(pw, n) \cdot H_0(n)^{s_0}, H_1(pw, n) \cdot H_1(n)^{s_0} \cdot M)$. It then computes $C \leftarrow \text{SKE.Enc}(s_0, (C_0, C_1))$.

Let P be any t-subset of [m]. The ciphertext components $H_0(n)^{s_0}$ and $H_1(n)^{s_0}$ can be expressed as $H_0(n)^{s_0} = H_0(n)^{\Sigma_{i \in P} \lambda_{P,i} s_i}$ and $H_1(n)^{s_0} = H_1(n)^{\Sigma_{i \in P} \lambda_{P,i} s_i}$ respectively.
Decryption (Refer to FIG. 7 and to FIG. 8).

The decryption protocol begins with the server informing the rate-limiters of the nonce n, and decrypting the ciphertext C to obtain $(C_0, C_1)$. The server then computes the value $Y_{0,0} := C_0 \cdot H_0(pw, n)^{-1}$, while the i-th rate-limiter computes $Y_{i,0} : H_0(n)^{s_i}$. Conceptually, the parties would like to check if $Y_{0,0} = \Pi_{i \in P} Y_{i,0}^{\lambda_{P,i}}$ for some t-subset P of [m]. If the relation is satisfied, meaning that the password is likely correct, the rate-limiters would jointly help the server to compute $H_1(n)^{s_0}$, which allows the latter to recover the message M. However, naively performing the joint computation of $H_1(n)^{s_0}$ would cost one extra round of computation. In the following, a three-phase protocol is outlined where the round for computing the value $H_1(n)^{s_0}$ is merged with one of the rounds in the checking procedure.

Step a) First, the parties jointly compute an encryption of the value $Z := Y_{0,0}^{-1} \Pi_{i \in P} Y_{i,0}^{\lambda_{P,i}}$ under the public key $K = K_0 \cdot \overline{K}_0$, where the corresponding secret key is secret-shared among the participants. This can be done by having the parties encrypt their respective inputs using the linearly-homomorphic ElGamal encryption scheme, exchange the ciphertexts with each other (via the server), and homomorphically compute an encryption of Z locally. This costs 2 rounds of communication.

Recall that the goal of the protocol is to allow the server to obtain $H_1(n)^{s_0}$ in the case Z=I (the identity element). We observe that for a randomly sampled $\tilde{r}$ and for an arbitrary group element A, $Z^{\tilde{r}} \cdot A = A$ when Z=I, and uniformly random otherwise. With this observation, in the second phase, step b), the parties jointly compute the encryption of $Z^{\tilde{r}}$ and $Z^{\tilde{r}'} \cdot H_1(n)^{s_0}$ respectively for random $\tilde{r}$ and $\tilde{r}'$. Similar to the first phase, this costs another 2 rounds of communication.

In the last phase, step c), the parties jointly help the server to decrypt the ciphertexts, so that the latter can check whether $Z^{\tilde{r}} = I$ (and hence Z=I), and if so obtain $H_1(n)^{s_0}$. This costs 1 round of communication. Together with the first round where the server sends the nonce n, we obtain a 6-round protocol.

At this point, the decryption functionality is already achieved and the protocol can already be terminated. However, the rate-limiters have no knowledge about whether the decryption was successful or not, i.e., whether Z=I, and thus can only perform "coarse-grained" rate-limiting. That is, the rate-limiters would count both successful and failed decryption attempts, since they cannot distinguish between the two. This is often sufficient in applications, since typically a user would not login (successfully) too frequently. To support "fine-grained" rate-limiting, the server would send an extra message to the rate-limiters to allow them to decrypt the encryption of $Z^{\tilde{r}}$. These additional steps are highlighted in dashed boxes in FIG. 8. This costs an extra round of communication and results in a 7-round protocol.

Key Rotation and Ciphertext Update (Refer to FIG. 9, FIG. 11, as Well as to FIG. 10).

The goal of key-rotation is to update the secret keys from $sk_i$ to $sk'_i$, where $$sk_i = (s_i, k_i, S_0, K_0, \{\overline{S}_j, \overline{K}_j\}_{j=0}^{t-1})$$

$$sk'_i = (s'_i, k'_i, S'_0, K'_0, \{\overline{S}'_j, \overline{K}'_j\}_{j=0}^{t-1})$$

where $s'_0$ is a fresh secret key for SKE, and the following properties hold:

$$K'_0 = K_0^\gamma = G^{k'_0}$$

$$\forall j \in [0, t-1] \quad \overline{S}'_j = \overline{S}_j G^{\beta_j}$$

$$\forall j \in [0, t-1] \quad \overline{K}'_j = \overline{K}_j^\gamma G^{\delta_j}$$

$$\forall i \in [m] \quad G^{s'_i} = \prod_{j=0}^t \overline{S}'^{i^j}_j$$

-continued $$\forall\, i \in [m] \quad G^{k_i'} = \prod_{j=0}^{t} \overline{K}'_j{}^{i^j}$$

for some random integers $\overline{\beta}_0, \ldots, \overline{\beta}_{t-1}, \gamma, \overline{\delta}_0, \ldots, \overline{\delta}_{t-1}$ sampled by the server.

Given the update token $(s_0, s'_0, \overline{\beta}_0)$ and a nonce n, the server can simply update each ciphertext $C \in SKE.Enc(s_0, (C_0, C_1))$ to $C' \leftarrow SKE.Enc(s'_0, (C'_0, C'_1))$ where $C'_0 := C_0 \cdot H_0(n)^{\overline{\beta}_0}$ and $C'_1 := C_1 \cdot H_1(n)^{\overline{\beta}_0}$.

Correctness and Security.

The correctness of the construction according to the invention follows from the correctness of SKE and the completeness of the NIZKPoK scheme described in the Appendix. Below, we state the security of the construction according to the invention with respect to the two security properties hiding and soundness. Definitions of the terms hiding and soundness, and a proof sketch for the security are given in the Appendix below.

Theorem 1 (Hiding)

If the decisional Diffie-Hellman (DDH) assumption holds with respect to GGen, and SKE is CCA-secure, then the (t, m)-PHE scheme constructed above is hiding in the random oracle model.

Theorem 2 (Soundness)

If the discrete logarithm assumption holds with respect to GGen, then the (t, m)-PHE scheme constructed above is sound in the random oracle model.

Note that there is an error in [LER+18], where the strong soundness property is claimed to hold assuming only the soundness of the NIZKPoK, which in turn holds unconditionally in the random oracle model. In fact, they would also need to rely on the discrete logarithm assumption.

Evaluation

Following prior work [LER+18], Server and rate-limiters are implemented in Python using the Charm [AGM+13] framework. For interactions the falcon REST framework (for the rate-limiter), Python requests (for the server), and HTTP keep-alive were used. The cryptographic primitives, namely SHA-256 and NIST P-256 have also been kept. This enables meaningful comparison between the results of this implementation and the previous scheme.

All results are measured in the LAN setting for different choices of the threshold t and number of rate-limiters m. The threshold variant requires several communication rounds, especially in the decryption protocol. Individual intermediate rounds are transmitted via POST calls. The rate-limiters use in-memory dictionaries for storing the states. In our experiment setup, the server is sending out multiple requests at once and waits for t rate-limiters to respond.

Results

Latency.

The latency of encryption (resp. decryption) of the (t, m)-PHE scheme has been measured, i.e., the time needed to complete an encryption (resp. decryption) protocol execution. For t=m=1, Table 1 shows that the average latency for encryption is 8.431 ms, and that for decryption is 18.763 is, where the averages are taken over 100 executions. Further experiments show that the threshold t and total number of rate-limiters m do not affect the latency significantly.

TABLE 1

Latency Comparison

| Scheme | Latency in ms |
| --- | --- |
| [LER+18]-Encrypt | 4.501 |
| [LER+18]-Decrypt | 4.959 |
| Ours-Encrypt | 8.431 |
| Ours-Decrypt | 18.763 |

The scheme presented here has a higher latency by an estimated factor of two for encryption and a factor of three for decryption, mainly due to the additional communication rounds (2× for encryption and 3× for the decryption protocol) compared to the PHE in [LER+18].

Throughput.

To estimate the computational resources needed, the throughput (maximum number of encryption and decryption requests per time) of (t, m)-PHE for different thresholds t and number of rate-limiters m has been measured. For various values of (t, m) with t=m, FIG. 12 and FIG. 13 show the inverse of the throughput (i.e., amortized time per request) and the throughput against the threshold of t respectively, while the raw data is reported in Table 2. The reported numbers are all averages over 1000 executions. As shown in the figures, the amortized time per request scales somewhat linearly with the threshold t. Further experiments show that increasing the number of rate-limiters m for a fixed threshold t does not significantly affect the throughput.

There is a gradual reduction of throughput for a higher number of rate-limiters. This is due to an implementation artifact that forces sequential processing of answers. Parallelization should remove this bottleneck and help (t, m)-PHE scale more efficiently. We also expect that implementing (t, m)-PHE in programming languages with compiler optimizations, e.g., Rust [MK14], would significantly improve the performance.

DISCUSSION

In this section miscellaneous topics related to the construction according to this invention will be discussed, including different variants, an optimization, a generalization, extensions,

TABLE 2

Encryption and Decryption Requests per Second

| Threshold t | Encryption Requests/s | Decryption Requests/s |
| --- | --- | --- |
| 1 ([LER+18]) | 736.59 | 711.07 |
| 1 | 524.33 | 192.91 |
| 3 | 228.71 | 114.38 |
| 5 | 145.84 | 67.01 |
| 8 | 105.36 | 47.03 |
| 11 | 65.05 | 27.94 |
| 13 | 53.79 | 22.03 |
| 15 | 48.96 | 19.68 | and applications.

Fine-Grained Rate-Limiting.

The construction according to the present invention leads to two slightly different variants of (t, m)-PHE—one which supports fine-grained rate-limiting and one which only supports coarse-grained rate-limiting. The former requires a 7-round decryption protocol while the latter requires only 6 rounds. Apart from saving communication costs, the coarse-grained variant has an additional benefit that the rate-limiters stay oblivious to whether the password was correct. For practical purposes this can also be interpreted as follows: For a login process, server and rate-limiters first execute the 6-round protocol, and the server considers the user as successfully authenticated. The last message (the 7-th round) can then be sent in the background to the rate-limiters, who will then "refund" the login attempt.

Both variants are covered by our security definitions and proofs: While the fine-grained variant is covered natively, the coarse-grained variant is also covered as it only penalizes the adversary for additional (successful) decryption attempts.

Further Optimizations.

It should be noted that the proofs $\pi_{1,i}$, $\pi_{2,i}$, $\pi'_{2,i}$ can be merged into a single proof in a non-blackbox way. Conceptually, until the joint decryption phase, the parties only compute on random group elements and thus verifying the integrity of the messages can be delayed until right before the joint decryption phase. Merging the proofs saves some communication cost by not sending duplicating commitments corresponding to the same witness. However doing so would further complicate the presentation of our protocol and hide its structure. Therefore we choose to not incorporate this optimization.

More General Access Structures and Dynamic Rate-Limiters.

Below, extensions of the present (t, m)-PHE scheme obtained by extending the underlying secret sharing scheme are discussed.

The scheme presented here only supports a basic threshold access structure. In real-world deployments, more complex access structures might be desirable (e.g., to have a single backup rate-limiter who is normally offline, or to require rate-limiters from different geographic areas in addition to a threshold of them).

To this end, observe that the Shamir secret sharing scheme we are using can be replaced by any linear secret sharing scheme without further changing the protocol. The resulting construction supports any access policies specified by monotone span programs [KW93].

In a real-world application of (t, m)-PHE, it might happen that the keys of some rate-limiters are lost due to an incident or malicious intervention. If too many rate-limiter keys are lost, the server risks losing all the user data as they can no longer be decrypted. To prevent such situations, it is useful to consider natural extensions of (t, m)-PHE which allows recovery of lost rate-limiter keys and changing the set of rate-limiters (to a new set of possibly different size) dynamically.

While standard methods [AGY95] exist for dynamic resharing, due to our more relaxed security requirements, the round complexity of dynamic resharing can be improved: Let $s_i$ be the i-th share of the conceptual rate-limiter secret key so generated by a (t, m)-secret sharing scheme. To convert to a new (t', m') system, a t-subset $I \subset [m]$ of the previous share-holders create m' shares $\{s_{i,j}\}_{j \in [m']}$ of their shares $s_i$ as follows. Each $i \in I$ sets $\bar{s}_{i,0} := s_i$ and samples $\bar{s}_{i,k}$ for $k \in [t'-1]$. It then computes $s_{i,j} := \Sigma_{k=0}^{t'-1} \bar{s}_{i,k} j^k$ for each $j \in [m']$, and $\bar{S}_{i,k}$ for $k \in [t'-1]$. The share $s_{i,j}$ is sent to the new j-th rate-limiter, while $\{\bar{S}_{i,k} = G^{\bar{s}_{i,k}}\}_{k=0}^{t'-1}$ is broadcasted. Upon receiving the shares $\{s_{i,j}\}_{i \in I}$, each new shareholder $j \in [m']$ can recover their share $s'_j$ as $$s'_j = \mathcal{L}_I(s_{i_1,j}, \ldots, s_{i_t,j})$$

using a linear function $\mathcal{L}_I$ determined by the set I. To see that $\{s'_j\}_{j \in [m']}$ are valid shares of the conceptual secret key $\bar{s}_0$, note that for any t'-subset $J \subseteq [m']$, we have $$\mathcal{L}_J(\{s'_j\}_{j \in J}) = \mathcal{L}_J(\{\mathcal{L}_I(\{s_{i,j}\}_{i \in I})\}_{j \in J})$$
$$= \mathcal{L}_I(\{\mathcal{L}_J(\{s_{i,j}\}_{j \in J})\}_{i \in I})$$
$$= \mathcal{L}_I(\{s_i\}_{i \in I})$$
$$= s_0$$

All parties can also compute the new public key $\bar{S}'_k$ for $k \in [0, t'-1]$ as a power product of $\{\bar{S}_{i,k}\}_{i \in I}$ with coefficients given by $\mathcal{L}_I$. The well-formedness of $s'_j$ can then be publicly verified using the new public keys $\bar{S}'_0, \ldots, \bar{S}'_{t'-1}$.

Non-Interactive Rotation.

The key-rotation protocol in the construction presented here is a non-interactive protocol initiated by the server. This is useful in practice as it means that not all rate-limiters need to be reachable to execute the key-rotation protocol. Instead, the server can initiate key-rotation ahead of time, and cache the messages supposed to be sent the rate-limiters until they become available. It is even possible to queue several key-rotations while a rate-limiter is unavailable (e.g., due to maintenance) and later apply all the changes in one shot.

It is, however, important to remember that leaking the key-rotation materials will defeat the self-healing properties of key-rotation. An adversary who learns this information can construct the new (resp. old) keys associated with this key-rotation material if it also has knowledge of the old (resp. new) keys. Therefore caching the key-rotation materials has to be based on a balanced decision in practical deployments.

Cold Storage.

One of the applications of (t, m)-PHE concerns cold storage: The server operator spawns a number of additional rate-limiters which suffices to perform decryption, and stores their keys offline. As long as these keys are well-protected (e.g., physically) this does not reduce the security of the deployed system and, in the case of irresponsive rate-limiters the server operator can always recover its data.

The non-interactive nature of our key-rotation protocol helps with this use-case. As long as key-rotations happen infrequently, it is possibly to store (a sequence of) key-rotation materials for each rate-limiters in cold-storage along with the rate-limiter keys. Once needed these materials can the be recombined to restore an up-to-date set of rate-limiter keys.

REFERENCES

[AGM+13] Joseph A. Akinyele, Christina Garman, Ian Miers, Matthew W. Pagano, Michael Rushanan, Matthew Green, and Aviel D. Rubin. Charm: a framework for rapidly prototyping cryptosystems. *Journal of Cryptographic Engineering*, 3(2):111-128, 2013.

[AGY95] Noga Alon, Zvi Galil, and Moti Yung. Efficient dynamic-resharing "verifiable secret sharing" against mobile adversary. In Paul Spirakis, editor, *Algorithms—ESA '95*, pages 523-537, Berlin, Heidelberg, 1995. Springer Berlin Heidelberg.

[AMMM18] Shashank Agrawal, Peihan Miao, Payman Mohassel, and Pratyay Mukherjee. PASTA: PASsword-based threshold authentication. In David Lie, Mohammad Mannan, Michael Backes, and XiaoFeng Wang, editors, ACM CCS 2018: *25th Conference on Computer and Communications Security*, pages 2042-2059, Toronto, ON, Canada, Oct. 15-19, 2018. ACM Press.

[BJSL11] Ali Bagherzandi, Stanislaw Jarecki, Nitesh Saxena, and Yanbin Lu. Password-protected secret sharing. In Yan Chen, George Danezis, and Vitaly Shmatikov, editors, *ACM CCS 2011: 18th Conference on Computer and Communications Security*, pages 433-444, Chicago, Ill., USA, Oct. 17-21, 2011. ACM Press.

[ECS+15] Adam Everspaugh, Rahul Chatterjee, Samuel Scott, Ari Juels, and Thomas Ristenpart. The pythia PRF service. In Jaeyeon Jung and Thorsten Holz, editors, *USENIX Security 2015: 24th USENIX Security Symposium*, pages 547-562, Washington, D.C., USA, Aug. 12-14, 2015. USENIX Association.

[ElG84] Taher ElGamal. A public key cryptosystem and a signature scheme based on discrete logarithms. In G. R. Blakley and David Chaum, editors, Advances in *Cryptology—CRYPTO '84*, volume 196 of *Lecture Notes in Computer Science*, pages 10-18, Santa Barbara, Calif., USA, Aug. 19-23, 1984. Springer, Heidelberg, Germany.

[FLPQ13] Pooya Farshim, Benoit Libert, Kenneth G. Paterson, and Elizabeth A. Quaglia. Robust encryption, revisited. In Kaoru Kurosawa and Goichiro Hanaoka, editors, *PKC 2013: 16th International Conference on Theory and Practice of Public Key Cryptography*, volume 7778 of *Lecture Notes in Computer Science*, pages 352-368, Nara, Japan, Feb. 26-Mar. 1, 2013. Springer, Heidelberg, Germany.

[FS87] Amos Fiat and Adi Shamir. How to prove yourself: Practical solutions to identification and signature problems. In Andrew M. Odlyzko, editor, *Advances in Cryptology—CRYPTO '86*, volume 263 of *Lecture Notes in Computer Science*, pages 186-194, Santa Barbara, Calif., USA, August 1987. Springer, Heidelberg, Germany.

[KW93] Mauricio Karchmer and Avi Wigderson. On span programs. In *Proceedings of Structures in Complexity Theory*, pages 102-111, 1993.

[LER+18] Russell W. F. Lai, Christoph Egger, Manuel Reinert, Sherman S. M. Chow, Matteo Maffei, and Dominique Schröder. Simple password-hardened encryption services. In William Enck and Adrienne Porter Felt, editors, *USENIX Security 2018: 27th USENIX Security Symposium*, pages 1405-1421, Baltimore, Md., USA, Aug. 15-17, 2018. USENIX Association.

[LESC17] Russell W. F. Lai, Christoph Egger, Dominique Schröder, and Sherman S. M. Chow. Phoenix: Rebirth of a cryptographic password-hardening service. In Engin Kirda and Thomas Ristenpart, editors, *USENIX Security 2017: 26th USENIX Security Symposium*, pages 899-916, Vancouver, BC, Canada, Aug. 16-18, 2017. USENIX Association.

[MK14] Nicholas D. Matsakis and Felix S. Klock, II. The rust language. *Ada Lett.*, 34(3):103-104, October 2014.

[Muf15] Allec Muffet. Facebook: Password hashing and authentication. https://www.youtube.com/watch?v-7dPR-FoKteIU, 2015. Video.

[PCI16] PCI Security Standards Council. Requirements and security assessment procedures. PCI DSS v3.2, 2016.

[Sch90] Claus-Peter Schnorr. Efficient identification and signatures for smart cards. In Gilles Brassard, editor, *Advances in Cryptology—CRYPTO '89*, volume 435 of *Lecture Notes in Computer Science*, pages 239-252, Santa Barbara, Calif., USA, Aug. 20-24, 1990. Springer, Heidelberg, Germany.

[SFSB16] Jonas Schneider, Nils Fleischhacker, Dominique Schröder, and Michael Backes. Efficient cryptographic password hardening services from partially oblivious commitments. In Edgar R. Weippl, Stefan Katzenbeisser, Christopher Kruegel, Andrew C. Myers, and Shai Halevi, editors, *ACM CCS 2016: 23rd Conference on Computer and Communications Security*, pages 1192-1203, Vienna, Austria, Oct. 24-28, 2016. ACM Press.

[Sha79] Adi Shamir. How to share a secret. *Communications of the Association for Computing Machinery*, 22(11):612-613, November 1979.

APPENDIX

Computational Assumption

Below, the discrete logarithm and decisional Diffie-Hellman assumptions are recalled.

Definition 3 (Discrete Logarithm)

We say that the discete logarithm assumption holds with respect to GGen if for all PPT adversaries $\mathcal{A}$ $$\Pr\left[ x = x' : \begin{array}{c} (\mathbb{G}, p, G) \leftarrow GGen(1^\lambda) \\ x \leftarrow s\mathbb{Z}_p \\ x' \leftarrow \mathcal{A}(\mathbb{G}, p, G, G^x) \end{array} \right] \leq negl(\lambda).$$

Definition 4 (DDH)

We say that the decisional Diffie-Hellman assumption holds with respect to GGen if for all PPT adversaries $\mathcal{A}$ $$\left| \Pr\left[ b = 1 : \begin{array}{c} (\mathbb{G}, p, G) \leftarrow GGen(1^\lambda) \\ x, y \leftarrow s\mathbb{Z}_p \\ b \leftarrow \mathcal{A}(\mathbb{G}, p, G, G^x, G^y, G^{xy}) \end{array} \right] - \Pr\left[ b = 1 : \begin{array}{c} (\mathbb{G}, p, G) \leftarrow GGen(1^\lambda) \\ x, y, z \leftarrow s\mathbb{Z}_p \\ b \leftarrow \mathcal{A}(\mathbb{G}, p, G, G^x, G^y, G^z) \end{array} \right] \right| \leq negl(\lambda).$$

Non-Interactive Zero-Knowledge Proof of Knowledge (NIZKPoK)

We recall the notion of non-interactive zero-knowledge proof of knowledge (NIZKPoK) and a construction for generalized discrete logarithm relations. FIG. 14 illustrates a non-interactive zero-knowledge proof of knowledge.

Let $R \subseteq \{0,1\}^* \times \{0,1\}^* \times \{0,1\}^*$ be a ternary relation decidable in polynomial time. Given a common reference string (CRS) crs, we say that w is a witness of a statement x if $(crs, x, w) \in R$.

A tuple of PPT algorithms (Gen, Prove, Vf) is said to be a non-interactive proof of knowledge (NIZKPoK) scheme for the relation R if the following properties hold:

(Perfect Completeness) For all non-uniform polynomial-time algorithms $\mathcal{A}$ $$\Pr\left[ (crs, x, w) \notin R \vee b = 1 : \begin{array}{c} crs \leftarrow Gen(1^\lambda) \\ (x, w) \leftarrow \mathcal{A}(crs) \\ \pi \leftarrow Prove(crs, x, w) \\ b \leftarrow \vee f(crs, x, \pi) \end{array} \right] = 1.$$

(Statistical Proof of Knowledge) There exists a probabilistic polynomial time extractor $\varepsilon$ such that, for all (unbounded) adversaries $\mathcal{A}$, $$\Pr\left[(crs, x, w) \notin R \wedge b = 1 : \begin{array}{c} crs \leftarrow Gen(1^\lambda) \\ (x, w) \leftarrow \mathcal{A}(crs) \\ w \leftarrow \varepsilon(crs, x, \pi) \\ b \leftarrow \vee f(crs, x, \pi) \end{array}\right] \leq negl(\lambda).$$

Note that schemes satisfying this property in the common-reference-string model cannot be zero-knowledge, as the extractor $\varepsilon$ does not have secret inputs. This is however not an issue in the random oracle model, where $\varepsilon$ has black-box access to further copies of $\mathcal{A}$ with the randomness used to define $(x, \pi)$, and simulates responses to random oracle queries made by $\mathcal{A}$. Furthermore, $\mathcal{A}$ is restricted to make only a polynomial number of random oracle queries.

(Computational Zero-Knowledge) There exists a probabilistic polynomial time simulator $\mathcal{S}$, such that for all probabilistic polynomial time adversaries $\mathcal{A}_1$ and non-uniform polynomial time algorithms $\mathcal{A}$, $$\left| \Pr\left[\begin{array}{c}(crs, x, w) \in R \wedge \\ \mathcal{A}_1(crs, x, \pi) = 1\end{array} : \begin{array}{c} crs \leftarrow Gen(1^\lambda) \\ (x, w) \leftarrow \mathcal{A}_2(crs) \\ \pi \leftarrow Prove(crs, x, w) \end{array}\right] - \Pr\left[\begin{array}{c}(crs, x, w) \in R \wedge \\ \mathcal{A}_1(crs, x, \pi) = 1\end{array} : \begin{array}{c} crs \leftarrow Gen(1^\lambda) \\ (x, w) \leftarrow \mathcal{A}_2(crs) \\ \pi \leftarrow \mathcal{S}(crs, x) \end{array}\right] \right| \leq negl(\lambda).$$

In the random oracle model, $\mathcal{S}$ simulates responses to random oracle queries made by $\mathcal{A}_1$ and $\mathcal{A}_2$. Furthermore, $\mathcal{A}_2$ is restricted to make only a polynomial number of random oracle queries.

Let GGen:$1^\lambda \mapsto crs = (\mathbb{G}, G, p)$ be a group generator which generates a cyclic group $\mathbb{G}$ of order p with generator G. Let H:$\{0, 1\}^* \to \mathbb{Z}_p$ function. We recall in FIG. 14 a generalized Schnorr protocol [Sch90] (Prove, Vf) which is made non-interactive using the Fiat-Shamir transformation [FS87]. It is well known that the scheme (GGen, Prove, Vf) is a NIZKPoK for the relation $R_{GDL}$ if H is modeled as a random oracle.

Security Analysis
Formalization

We formalize (t, m)-PHE and define the two security properties, hiding and soundness, which consolidate previous properties of PHE [LER+18] by the same names.

Below, we give definitions of the two security properties hiding and soundness, and proof sketches for Theorems 1 and 2.

Hiding (Theorem 1)
The Term.

Hiding refers to the property that the adversary cannot do better than performing online password guessing attacks to learn an encrypted message, as long as it does not corrupt the server and at least t rate-limiters at the same time.

The new hiding definition used here consolidates the previous hiding, obliviousness, and forward security definitions of PHE [LER+18]. In particular, the new hiding definition captures attack strategies in which the adversary corrupts different parties at different points in time.

In previous security definitions of PHE [LER+18, LESC17], a corrupt party stays corrupt for the entire duration of the security experiments: In the hiding experiment the server is always corrupt, while in the partial obliviousness experiment the rate-limiter is always corrupt. It was unclear what the security guarantee is, for example, when the adversary first corrupts the server, instructs the parties to perform key-rotation, and then corrupt the rate-limiter. Forward security, which states that the tuples of rotated keys and updated ciphertexts are indistinguishable to fresh ones, suggests that there should be no relation between keys and ciphertexts created or refreshed at different times, but does not lead to a formal statement.

In order to explicitly state the security guarantees brought by key rotation, we merge the hiding, partial obliviousness and forward security definitions of PHE [LER+18] into a single new hiding definition, reefer to FIG. 15. Intuitively, hiding models the property that no party should be able to do better than online brute force attacks against the password space. As passwords have limited entropy, we limit the decryption queries the adversary can do using the counter DecCount which is bounded by $Q_{Dec}$. At any given time, the adversary may either corrupt the server and up to t-1 rate limiters, or an arbitrary subset of rate-limiters but not the server. It can also allow the parties to execute an honest key-rotation, after which all parties are considered honest, and the adversary can corrupt a possibly different subset of parties again.

We focus on a static corruption model, where the adversary must declare the set of corrupt parties for the next time period when requesting for an honest key-rotation. Hererby, a time period is understood to be the time between two honest key-rotations. This corruption model is already stronger than that in previous work [LER+18,LESC17], where the adversary must declare the corrupt party at the very beginning of the experiment, and cannot change its choice throughout the experiment. We also define an adaptive variant, where the adversary can request to corrupt any party at any time.

The adversary $\mathcal{A}$ is given access to oracles for all interactions (encryption, decryption, key rotation, and ciphertext update) in the system. The oracles interfacing protocol executions take an indexed set of procedures and run the respective protocols with the honest code replaced by adversarially choosen methods according to that set. The encrypt and decrypt oracles Enc$\mathcal{O}$ and Dec$\mathcal{O}$ model normal interactions with adversarially choosen messages resp. ciphertexts. The decrypt challenge oracle DecCh$\mathcal{O}$, in contrast, allows the adversary to observe interactions between an honest server and potentially malicious rate-limiters with the correct challenge password. The oracle Rot$\mathcal{O}$ allows the adversary to run the key rotation protocol. The adversary can request for an honest key-rotation, where the update token is not leaked to the adversary, while the set of corrupted parties is reset depending on the choice of the adversary. The adversary can also request for a malicious key-rotation, where the code of some parties are possibly replaced by malicious ones. The oracle Udt$\mathcal{O}$ allows updating any ciphertext with the most recent update token $\tau$.

In the adaptive variant, the adversary can learn the current secret keys of parties of its choice using the corrupt oracle Corr$\mathcal{O}$. Finally, the adversary can generate a challenge ciphertext using Ch$\mathcal{O}$. Notice that the challenge may only be generated once and the server code used to generate the challenge ciphertext is honest (although the server key might be revealed via Corr$\mathcal{O}$ and Rot$\mathcal{O}$). (A multi-challenge version of the definition is implied by the single-challenge one using standard hybrid argument.) Intuitively this is reasonable as a malicious server can store the message and the password outside the protocol, and therefore security for maliciously generated ciphertexts is unrealistic. Note that the adversary may no longer choose the server key for the challenge ciphertext which was allowed in previous definitions [LER+18,LESC17] in the case of honest rate-limiters. This simplifies the definition and we believe it is of limited practical interest to allow an adversarially choosen server key but honest execution of the server code.

We observe that the previous partial obliviousness definition of PHE does not cover a realistic attack: If the adversary controls the rate-limiter(s) it can act as an end-user and try an arbitrary number of passwords as it fully controls the rate-limiting. This attack was not captured, as the server withholds the decryption result if the adversary queries the decryption oracle on any of the two challenge passwords. In our hiding definition, we capture such an attack by not withholding the decryption result but have both the server and the rate-limiters restrict the number of login attempts. More precisely, we capture this by restricting the decryption queries independent of the set of corrupted parties.

Definition 1 (Hiding)

A $(t, m)$-PHE $\Pi$ is hiding if, for any PPT adversary $\mathcal{A}$, any integer $Q_{Dec} \geq 0$, and any password space $\mathcal{PW}$ with support size of at least $Q_{Dec}$, $$\frac{1}{2}|Pr[Hid^0_{\Pi,\mathcal{A},Q_{Dec},\mathcal{PW}}(1^\lambda, 1^m, 1^t) = 1] - Pr[Hid^1_{\Pi,\mathcal{A},Q_{Dec},\mathcal{PW}}(1^\lambda, 1^m, 1^t) = 1]| \leq \frac{Q_{Dec}}{|\mathcal{PW}|} + negl(\lambda).$$

For simplicity, we assume that passwords are distributed uniformly in the password space. The definition can be easily generalized to cover arbitrary password distributions. Proof.

We want to prove that the construction according to the invention is hiding (under static corruption). That is, for any PPT adversary $\mathcal{A}$, any integer $Q_{Dec} \geq 0$, and a uniform password distribution $\mathcal{PW}$ with $|\mathcal{PW}| \geq Q_{Dec}$, $$\frac{1}{2}|Pr[Hid^0_{\Pi,\mathcal{A},Q_{Dec},\mathcal{PW}}(1^\lambda, 1^m, 1^t) = 1] - Pr[Hid^1_{\Pi,\mathcal{A},Q_{Dec},\mathcal{PW}}(1^\lambda, 1^m, 1^t) = 1]| \leq \frac{Q_{Dec}}{|\mathcal{PW}|} + negl(\lambda).$$

We will prove the above statement via a typical hybrid argument, for that we define the following hybrid experiments:

$Hyb_{b,0}$ is identical to $Hid^b_{\Pi,\mathcal{A},Q_{Dec},\mathcal{PW}}(1^\lambda, 1^m, 1^t)$.

$Hyb_{b,1}$ is mostly identical to $Hyb_{b,0}$, except that all zero-knowledge proofs are simulated by running the simulator of the NIZKPoK scheme. It it straightforward to show that, for all $b \in \{0, 1\}$, $|Pr[Hyb_{b,0}=1]-Pr[Hyb_{b,1}=1]| \leq neg|(\lambda)$ using the zero-knowledge property of the NIZKPoK scheme.

$Hyb_{b,2}$ is mostly identical to $Hyb_{b,1}$, except that when an honest key rotation is triggered (the adversary queries the Rot$\mathcal{O}$ oracle with HonestRot=1), the secret key components $(k_i, K_0, \{\overline{K}_j\}_{j=0}^{t-1})$ are freshly generated. For all $b \in \{0, 1\}$, note that $Hyb_{b,1}$ and $Hyb_{b,2}$ are functionally equivalent, therefore $Pr[Hyb_{b,1}=1]=Pr[Hyb_{b,2}=1]$.

$Hyb_{b,3,0}$ is identical to $Hyb_{b,2}$.

$Hyb_{b,3,q}$, where $q \in [Q_{Dec}]$, is mostly identical to $Hyb_{b,q-1}$, except that when answering the adversary's q-th query to the Dec$\mathcal{O}$ oracle which triggers the increment of the counter DecCount (called a critical query hereinafter), the group elements sent by honest parties are replaced by uniformly random elements, and the output M of the server (if honest) is always the empty string $\epsilon$.

It remains to show that for all $b \in \{0, 1\}$ and all $q \in [Q_{Dec}]$, $$|Pr[Hyb_{b,3,q-1} = 1] - Pr[Hyb_{b,3,q} = 1]| \leq \frac{1}{|\mathcal{PW}|} + negl(\lambda),$$

and $$|Pr[Hyb_{0,3,Q_{Dec}} = 1] - Pr[Hyb_{1,3,Q_{Dec}} = 1]| \leq negl(\lambda).$$

The theorem then follows.
From $Hyb_{b,3,q-1}$ to $Hyb_{b,3,q}$
We show that $$|Pr[Hyb_{b,3,q-1} = 1] - Pr[Hyb_{b,3,q} = 1]| \leq \frac{1}{|\mathcal{PW}|} + negl(\lambda)$$

under the DDH assumption in the random oracle model for all $b \in \{0, 1\}$ and $q \in [Q_{Dec}]$.

We define an intermediate hybrid experiment $Hyb'_{b,3,q}$, which is mostly identical to $Hyb_{b,3,q}$ except that when answering the adversary's q-th critical query, the message M output by the server, if honest, is computed honestly.

We can immediately see that $$|Pr[Hyb'_{b,3,q} = 1] - Pr[Hyb_{b,3,q} = 1]| \leq \frac{1}{|\mathcal{PW}|}$$

since the only way to distinguish between the two is to query Dec$\mathcal{O}$ and thus the random oracles $H_0$ and $H_1$ on $(pw^*, n^*)$.

It thus suffices to show that $|Pr[Hyb_{b,3,q-1}=1]-Pr[Hyb'_{b,3,q}=1]| \leq neg|(\lambda)$ under the DDH assumption.

Suppose not, we construct an adversary $\mathcal{B}$ against DDH as follows. Let the t-th honest key rotation query be the latest one before the q-th critical query. Let I be the set of corrupt parties requested by $\mathcal{A}$ during the t-th honest key rotation query. We consider two cases.

Case 1: $0 \notin I$.

Without loss of generality, we can assume that $I=[m]$. In this case, $\mathcal{B}$ receives a DDH instance $(G, G^\alpha, G^\beta, G^\gamma)$, and set $K_0 := G^\alpha$ when answering the t-th honest key rotation query. Note that $\mathcal{B}$ does not know $k_0 := \alpha$ and hence, during the time between the t-th and (t+1)-st honest key rotation, cannot answer Dec$\mathcal{O}$ oracle queries honestly. $\mathcal{B}$ however has knowledge of $\overline{k}_0$ for which $\overline{K}_0 = G^{\overline{k}_0}$. $\mathcal{B}$ therefore simulate the answers to Dec$\mathcal{O}$ oracle queries during this time period as follows. It is to be noted that $\mathcal{B}$ can answer DecCh $\mathcal{O}$ oracle queries honestly since it does not need to return the view of $\mathcal{S}$, while the views of $\mathcal{R}_i$ for all $i \in [m]$ can be computed without knowing $k_0$. $\mathcal{B}$ computes the views of all parties honestly except for the values $U_0, V_0, T_0$ and $T'_0$. For the q-th query, $\mathcal{B}$ sets $U_0:=G^\beta$ and $V_0:=G^\gamma \cdot G^{\beta k_0} \cdot Y_{0,0}^{-1}$. For other queries, $\mathcal{B}$ computes $U_0$ and $V_0$ honestly. For all queries, to compute $T_0$ and $T'_0$, $\mathcal{B}$ runs the extractor of the NIZKPoK to extract the discrete logarithm $\tilde{u}$ and $\tilde{u}'$ such that $\tilde{U}=G^{\tilde{u}}$ and $\tilde{U}'=G^{\tilde{u}'}$. It then compute $T_0:=G^{\alpha \tilde{u}}$ and $T'_0:=G^{\alpha \tilde{u}'}$.

Clearly, if $(G, G^\alpha, G^\beta, G^\gamma)$ is a DH tuple, $\mathcal{B}$ simulates $\text{Hyb}_{b,3,q-1}$ perfectly. Else, if $(G, G^\alpha, G^\beta, G^\gamma)$ is a random tuple, $\mathcal{B}$ simulates $\text{Hyb}'_{b,3,q}$ perfectly. The claim then follows.

Case 2: $0 \in I$.

Without loss of generality, we can assume that $I=\{0, i_1, \ldots, i_{t-1}\}$ for some $\tilde{I}:=\{i_1, \ldots, i_{t-1}\} \subseteq [m]$. In this case, let $M_I$ be the following (t-1)-by-t matrix $$M_I := \begin{bmatrix} 1 & i_1 & \cdots & i_1^{t-1} \\ \vdots & \vdots & \ddots & \vdots \\ 1 & i_{t-1} & \cdots & i_{t-1}^{t-1} \end{bmatrix}.$$

$\mathcal{B}$ receives a DDH instance $(G, G^\alpha, G^\beta, G^\gamma)$. When answering the t-th honest key rotation query, $\mathcal{B}$ generates secret key shares for the combined public key $\overline{K}_0:=G^\alpha$. For this, it samples a random vector $\vec{u}:=(u_0, \ldots, u_{t-1})^T \leftarrow s\ \text{Ker}(M_I)$ in the kernel of $M_I$, i.e., $M_I\vec{u}=\vec{0}$. It also samples a random vector $\vec{v}=(v_0, \ldots, v_{t-1})^T \leftarrow s\mathbb{Z}_p^t$. It sets $\overline{K}_j:=G^{\alpha u_j + v_j}$ for all $j \in [0, t-1]$. For the corrupt parties $i \in \tilde{I}$, $\mathcal{B}$ can compute secret Keys $k_i$ without knowledge of $\alpha$ as $k_i := \sum_{j=0}^{t-1} (\alpha u_j + v_j) i^j = \sum_{j=0}^{t-1} v_j i^j$ (since $M_I \vec{u}=\vec{0}$), which are then returned to $\mathcal{A}$. Note that $\mathcal{B}$ does not know $k_i := \sum_{j=0}^{t-1}(\alpha u_j + v_j) i^j$ for the honest parties $i \notin \tilde{I}$ and hence, during the time between the t-th and (t+1)-st honest key rotation, cannot answer Dec$\mathcal{O}$ oracle queries honestly. $\mathcal{B}$ can however simulate the views of all parties in a Dec$\mathcal{O}$ query using the DDH instance and the extractor of the NIZKPoK as in case 1. We thus arrive at a similar conclusion that, if $(G, G^\alpha, G^\beta, G^\gamma)$ is a DH tuple, $\mathcal{B}$ simulates $\text{Hyb}_{b,3,q-1}$ perfectly and, if $(G, G^\alpha, G^\beta, G^\gamma)$ is a random tuple, $\mathcal{B}$ simulates $\text{Hyb}'_{b,3,q}$ perfectly. The claim then follows.

From $\text{Hyb}_{0,3,Q_{Dec}}$ to $\text{Hyb}_{1,3,Q_{Dec}}$

We show that $$|Pr[\text{Hyb}_{0,3,Q_{Dec}}=1] - Pr[\text{Hyb}_{1,3,Q_{Dec}}=1]| \leq \text{neg}(\lambda)$$

assuming the CCA-security of SKE and DDH.

Suppose not, we construct an adversary $\mathcal{B}$ against the CCA-security of SKE or DDH as follows. Let the t-th honest key rotation query be the latest one before the $\text{Ch}\mathcal{O}_b$ oracle query. Let I be the set of corrupt parties requested by $\mathcal{A}$ during the t-th honest key rotation query. We consider two cases.

Case 1: $0 \notin I$.

Without loss of generality, we can assume that $I=[m]$. In this case, note that $\mathcal{S}$ remains uncorrupt when answering the $\text{Ch}\mathcal{O}_b$ oracle query, as well as the last (say t'-th, potentially malicious) key rotation query. For the t'-th key rotation query, $\mathcal{B}$ simulates most secret key components honestly, except that it sets $s_0:=\epsilon$. To generate the challenge ciphertext, $\mathcal{B}$ computes $C_0:=H_0(pw^*, n^*)H_0(n^*)^{s_0}$ and $C_{1,b}:=H_1(pw^*, n^*)H_1(n^*)^{s_0}M_b^*$ by interacting with the possibly malicious rate-limiters. It then submits $(C_0, C_{1,0})$ and $(C_0, C_{1,1})$ to the challenge oracle of SKE. During the time between the t'-th and the (t'+1)-st key rotation queries, whenever SKE.Enc $(s_0, \cdot)$ is supposed to be executed (except when answering the $\text{Ch}\mathcal{O}_b$ oracle query), $\mathcal{B}$ delegates the computation to the encryption oracle of SKE. $\mathcal{B}$ makes a random guess b' of the random bit used by the SKE challenger. Whenever SKE.Dec $(s_0, \cdot)$ is supposed to be executed on the challenge ciphertext $C^*$, the return value is replaced by $(C_0, C_{1,b'})$. When it is supposed to be executed on other non-challenge ciphertext, $\mathcal{B}$ delegates the computation to the decryption oracle of SKE. Clearly, when the guess b' is correct, $\mathcal{B}$ perfectly simulates the environments of $\text{Hyb}_{0,3,Q_{Dec}}$ or $\text{Hyb}_{1,3,Q_{Dec}}$, depending on the secret bit chosen by the SKE challenger.

Case 2: $0 \in I$.

We define an intermediate hybrid $\text{Hyb}'_{b,3,Q_{Dec}}$ which is mostly identical to $\text{Hyb}_{0,3,Q_{Dec}}$, except that when generating the challenge ciphertext, the experiment samples $(C_0, C_1) \leftarrow s\ \mathbb{G}^2$ uniformly at random (independent of $M_b^*$). Clearly $\text{Hyb}'_{0,3,Q_{Dec}}$ and $\text{Hyb}'_{1,3,Q_{Dec}}$ are functionally equivalent. It therefore suffices to prove that $$|Pr[\text{Hyb}'_{b,3,Q_{Dec}}=1] - Pr[\text{Hyb}_{b,3,Q_{Dec}}=1]| \leq \text{neg}(\lambda)$$

Without loss of generality, we can assume that $I=\{0, i_1, \ldots, i_{t-1}\}$ for some $\tilde{I}:=\{i_1, \ldots, i_{t-1}\} \subseteq [m]$. In this case, we will make use of the matrix $M_I$ defined above, and simulate the secret key components $s_i$ for $i \in \tilde{I}$ in a similar fashion. As before, although $\mathcal{B}$ does not possess the knowledge of $s_i$ (but only $G^{s_i}$) for $i \notin \tilde{I}$, encryption and decryption can be simulated given a DDH instance and by programming the random oracles. As an example, to compute $H_0(n)^{s_i}$ and $H_1(n)^{s_i}$ for $n \neq n^*$, $\mathcal{B}$ first samples $x_0$ and $x_1$ and programs $H_0(n):=G^{x_0}$ and $H_1(n):=G^{x_1}$. It can then compute $H_0(n)^{s_i}=G^{x_0 s_i}$ and $H_1(n)^{s_i}=G^{x_1 s_i}$. For $n=n^*$, $\mathcal{B}$ programs the random oracle similarly except that $G^{z_0}$ and $G^{z_1}$ are derived from the DDH instance. If $\mathcal{B}$ is given a DH instance, it simulates $\text{Hyb}_{b,3,Q_{Dec}}$ perfectly. Otherwise, $\mathcal{B}$ is given a random instance, and it simulates $\text{Hyb}'_{b,3,Q_{Dec}}$ perfectly. The claim then follows.

Soundness (Theorem 2)

The Term.

Soundness refers to the property that the server cannot be fooled to make wrong decisions during decryption. More precisely, it means that, for any fixed server secret key, a ciphertext cannot encode two different valid password-message pairs at the same time.

Our soundness definition consolidates the previous ones by capturing all attack strategies in a single security experiment. This definition is inspired by that of complete robustness of encryption schemes [FLPQ13], which in turn consolidates various robustness notions for encryption.

We define soundness of (t, m)-PHE which consolidates the soundness and strong soundness notions of PHE [LER+18]. Intuitively, these notions model the security property that the rate-limiter(s) should not be able to deceive the server, e.g., to convince the server that a false candidate password is correct, or to trick the server to decrypt a ciphertext into two distinct messages. The soundness and strong soundness of PHE [LER+18] are modeled by two security experiments which have complicated winning conditions, since there are many ways for the rate-limiter to deceive the server.

To capture this intuitive security property in a simpler way, we take inspirations from the complete robustness definition [FLPQ13] for encryption schemes, which intuitively captures the property that a ciphertext cannot be encrypting two distinct messages. Roughly speaking, the soundness of PHE requires that there is no inconsistency between an encryption session and a decryption session, whereas the strong soundness notion further requires that there is no inconsistency between two decryption sessions. To capture both deception strategies simultaneously, we define a robustness experiment where the adversary is given an encryption oracle and a decryption oracle. The former takes as input all the inputs of the server, including the randomness, during an encryption session, and possibly malicious programs for all the rate-limiters. The oracle then runs the encryption protocol between an honest execution of the server code on the given input, and the possibly malicious rate-limiters. The decryption oracle is defined in a similar way, except that the decryption protocol is run. Refer to FIG. 16 for an overview of the experiments.

The adversary is successful if an inconsistency occur between the communication transcripts produced by any two oracle queries.

Definition 2 (Soundness)

A (t, m)-PHE Π is sound if, for any PPT adversary $\mathcal{A}$, $$Pr[\text{Soundness}_{\Pi,\mathcal{A}}{}^0(1^\lambda,1^m,1^t)=1] \leq \text{negl}(\lambda).$$

Proof.

We give a high level idea of why an adversary against soundness cannot exist in the random oracle model, under the discrete logarithm assumption. Suppose such an adversary $\mathcal{A}$ exists, we consider the following experiment. First, it runs $\mathcal{A}$ as in the soundness experiment until $\mathcal{A}$ outputs the indices (i, j). It then retrieves $(sk_0, n, C, pw, M) := \text{Queries}[i]$ and $(sk'_0, n', C', pw', M') := \text{Queries}[j]$. With non-negligible probability, the condition $b_0 \wedge b_1 \wedge (b_2 \vee b_3)$ is satisfied. Since $b_0 \wedge b_1$ is satisfied, we have $$(sk_0, C) = (sk'_0, C') \wedge M \neq \bot \wedge M' \neq \bot.$$

By the second condition, we can deduce that regardless of whether these tuples were created during an encryption or decryption oracle query, the server did not abort the protocol. Thus, we must have $\text{KVf}(0, sk_0) = 1$, which means $sk_0$ is of the form $sk_0 = (s_0, k_0, S_0, K_0, \{\overline{S}_j, \overline{K}_j\}_{j=0}^{t-1})$ where $K_0 = G^{k_0}$. In the following, let $(C_0, C_1) \leftarrow \text{SKE.Dec}(s_0, C)$.

Suppose $(sk_0, n, C, pw, M)$ is created during an encryption oracle query. Then we must have $M \neq \epsilon$. By running the extractor $\epsilon$, whose existence is guaranteed by the proof of knowledge property of the NIZKPoK, on the proofs generated by the (possibly malicious) rate-limiters, the reduction can extract $\bar{s}_0$ such that $$C_0 = H_0(pw,n)H_0(n)^{\bar{s}_0} \tag{1}$$

$$C_1 = H_1(pw,n)H_1(n)^{\bar{s}_0}M. \tag{2}$$

Similarly, if $(sk'_0, n', C', pw', M')$ is created during an encryption oracle query, then $M' \neq \epsilon$, and the reduction can extract $\bar{s}_0$ such that $$C_0 = H_0(pw',n')H_0(n')^{\bar{s}_0} \tag{3}$$

$$C_1 = H_1(pw',n')H_1(n')^{\bar{s}_0}M'. \tag{4}$$

Suppose $(sk_0, n, C, pw, M)$ is created during a decryption oracle query, we consider two cases: 1) $M \neq \epsilon$, and 2) $M = \epsilon$. In the first case, the extraction process is slightly more complicated than when the tuple is created via encryption. Nevertheless, the experiment can also extract $\bar{s}_0$ so that it satisfies the above relations. In the second case, we can deduce that $$C_0 \neq H_0(pw,n)H_0(n)^{\bar{s}_0}. \tag{5}$$

Similar conclusion can be made if $(sk'_0, n', C', pw', M')$ is created during a decryption oracle query.

Next, we examine the conditions $b_2$ and $b_3$, where at least one of them must be satisfied. Suppose $b_2$ is satisfied, we have $((n, pw) = (n', pw')) \wedge (M \neq M')$. There are two possibilities.

1. $M = \epsilon$ and $M' \neq \epsilon$ (or $M \neq \epsilon$ and $M' \neq \epsilon$): Since $M = \epsilon$, the tuple must have been produced via decryption, and by Equation (5) we have $C_0 \neq H_0(pw,n)H_0(n)^{\bar{s}_0}$. However, since $M' \neq \epsilon$, by Equation (3) we have $C_0 = H_0(pw, n)H_0(n)^{\bar{s}_0}$ (note that $(n, pw) = (n', pw')$) which is a contradiction.

2. $M \neq \epsilon$ and $M' \neq \epsilon$: From Equations (2) and (4) we can deduce that $M = M'$, which is a contradiction.

Suppose $b_3$ is satisfied, we have $((n, pw) \neq (n', pw')) \wedge (M, M' \in \mathcal{M})$. Since $M, M' \in \mathcal{M}$, we must have $M \neq \epsilon$ and $M' \neq \epsilon$. Then, from Equations (1) and (3), we can deduce $$H_0(pw,n)H_0(n)^{\bar{s}_0}H_0(pw',n')^{-1}H_0(n')^{-\bar{s}_0} = I$$

However, since $(n, pw) \neq (n', pw')$, $H_0(pw, n)$ and $H_0(pw', n')$ are independent random elements, we obtain a non-trivial discrete logarithm representation of the identity element, which violates the discrete logarithm assumption.

What is claimed is:

1. A computer-implemented method for encrypting data by a server in cooperation with a predetermined number (m) of rate limiters,
the predetermined number (m) being greater than 1,
each of the rate-limiters being a respective processing unit different from each other and from the server, and having a respective secret key $(sk_1, \ldots, sk_i, \ldots, sk_m)$,
the server having a predetermined secret key $(sk_0)$,
the method comprising:
receiving, by the server, from the user, a user identification (un), and a password (pw) to be encrypted,
creating, by the server, a secret message (M),
the secret message (M) being a key suitable for use with a predetermined symmetric key encryption/decryption scheme,
generating, by the server in cooperation with a subset (P) of a size (t') which is equal to or greater than a predetermined threshold (t), out of the predetermined number (m) of rate limiters, on the basis of a predetermined interactive cryptographic encryption protocol, a ciphertext (C) which encrypts the user password (pw), and the secret message (M) using the respective secret keys $(sk_i)$ of the rate limiters of the subset (P),
the threshold (t) being smaller than or equal to the predetermined number (m) of rate limiters, and
the predetermined interactive cryptographic protocol being adapted such that the server needs only to interact with a subset (P) of the predetermined size (t) of the predetermined number (m) of rate limiters for decryption of the ciphertext (C) to recover the secret message (M),
storing, by the server, the ciphertext (C), in association with the user identification (un); and
deleting the secret message (M), and the password (pw).

2. The method of claim 1, further comprising
generating, by the server, a server nonce $(n_o)$, on the basis of a predetermined random process,
receiving, by the server, a predetermined number (m) of rate-limiter nonces $(n_1, \ldots, n_i, \ldots, n_m)$, each rate-limiter nonce $(n_i)$ created by a respective rate-limiter on a basis of a random operation,
making known the nonces to the predetermined number (m) of rate limiters,
using the nonces for generating the ciphertext (C).

3. The method of the claim 2, wherein:
the ciphertext (C) is a tuple ($C_0$, $C_1$) encrypted with a predetermined symmetric encryption key ($s_0$) which is a part of the server secret key ($sk_0$),
the tuple ($C_0$, $C_1$) being computed as $$C_0 = H_0(pw,n) \cdot H_0(n)^{\bar{s}_0}$$

$$C_1 = H_1(pw,n) \cdot H_1(n)^{\bar{s}_0} \cdot M$$

wherein:
$H_0$, $H_1$ representing independent Hash functions, $\bar{s}_0$ is part of a conceptual rate-limiter key which is secret-shared to the predetermined number (m) of rate-limiters on the basis of a predetermined linear secret sharing scheme with a reconstruction threshold equal to the subset (P) wherein for a given subset (P) of rate limiters, there exists a public linear combination such that $\bar{s}_0 = \Sigma_{j=1}^t \lambda_j s_{i_j}$ holds, with
t denoting the number of rate-limiters of the subset (P);
λ being a predetermined security parameter.

4. The method of claim 3, wherein:
for any subset (P) of the number (m) of rate-limiters $H_0$, $H_1$ can be expressed as $$H_0(n)^{\bar{s}_0} = H_0(n)^{\Sigma_{i \in P} \lambda_{P,i} s_i} \text{ and}$$

$$H_1(n)^{\bar{s}_0} = H_1(n)^{\Sigma_{i \in P} \lambda_{P,i} s_i}.$$

5. The method of claim 3, further comprising running, by the server, prior to creating the secret message (M), a setup algorithm comprising:
defining the threshold (t), and the number (m) of rate limiters,
generating the server secret key ($sk_0$), and
generating for each rate limiter (i) of the predetermined number (m) of rate-limiters the respective secret key ($sk_i$), such that from each secret key ($sk_0, \ldots, sk_m$) the size (t) of the subset (P) of rate limiters, and the number (m) can be derived
wherein the setup algorithm further comprises:
running a group generation algorithm which maps the security parameter ($1^\lambda$) to the description of a cyclic group GG (G, p, G) of prime order q with generator G, each of the secret keys ($sk_0, \ldots, sk_m$) has the format ($s_i$, $k_i$, $S_0$, $K_0$, $\{\bar{S}_j, \bar{K}_j\}_{j=0}^{t-1}$) and satisfies the following properties:

$$G^{s_i} = \prod_{j=0}^{t-1} \bar{S}_j^{i^J}, i \in [m]$$

$$G^{k_i} = \begin{cases} K_G & i = 0 \\ \prod_{j=0}^{t-1} \bar{K}_j^{i^J} & i \in [m] \end{cases}$$

6. The method of claim 5, further comprising:
verifying the validity of the secret keys ($sk_0, \ldots, sk_m$) by applying the following scheme:

if $i = 0$ then return ($G^{s_0} = S_0 \wedge G^{k_0} = K_0$)

else return $\left(G^{s_i} = \prod_{j=0}^{t-1} \bar{S}_j^{i^J} \wedge G^{k_i} = \prod_{j=0}^{t-1} \bar{K}_j^{i^J}\right)$ endif.

7. The method of claim 1, further comprising:
receiving, by the server, form the user, along with receiving the user identification (un), and the password (pw), user data (ud) to be encrypted,
encrypting, by the server, the user data (ud) by applying a predetermined user data symmetric key encryption/decryption scheme using the secret message (M) as encryption key, and
storing, by the server, the encrypted user data (ud).

8. A computer-implemented method for decrypting data by a server, in cooperation with a predetermined number of rate-limiters, the data being encrypted by the method of claim 1, the decrypting method comprising:
receiving, by the sewer, from the user a user identification (un), and the password (pw),
retrieving, by the server, the ciphertext (C), and the encrypted data stored in association with the user identification (un),
recovering the secret message (M) by decrypting, by the server with its secret key ($sk_0$) in cooperation with a subset (P) of a size (t'), which is equal to or greater than the predetermined threshold (t), out of the predetermined number (m) of rate limiters with their respective secret keys ($sk_i$), the ciphertext (C), and deleting, by the server, the secret message (M) and the user password (pw).

9. The method of claim 8, further comprising:
each rate-limiter associating a counter with the user identification (un), and incrementing the counter if the verification step fails due to a received incorrect password (pw), aborting the current decryption session, and blocking further receiving user identification and password for a predetermined time of at least the user to which a the counter is associated.

10. The method of claim 1, further comprising:
sending, by the server, the secret (n) to the subset (P') of rate-limiters;
computing, by the server, the value $$Y_{0,0} := C_0 \cdot H_0(pw,n)^{-1}$$

initiating the i-th rate-limiter of the subset (P') of rate-limiters to compute the value $$Y_{i,0} := H_0(n)^{s_i},$$

verifying that $$Y_{0,0} = \Pi_{i \in P} Y_{i,0}^{\lambda_{P,i}}$$

by the server and the subset (P') of rate-limiters performing the steps of:
a) computing the encryption of the value $$Z := Y_{0,0}^{-1} \Pi_{i \in P} Y_{i,0}^{\lambda_{P,i}}$$

with the key $K = K_0 \cdot \bar{K}_0$ the key K being the public key associated with a secret key which is secret-shared among the server and the subset (P') of rate-limiters;
b) computing an encryption of the values $Z^\kappa$ and $Z^{\kappa'} \cdot H_1(n)^{\bar{s}_0}$, for random $\kappa$ and $\kappa'$.
c) obtaining $H_1(n)^{\bar{s}_0}$ by decrypting Z the values $Y_t$; checking that $Z^\kappa = I$
I being an identity element;
and recovering the secret message (M) therefrom.

11. The method of claim 10, further comprising:
each rate-limiter implementing a counter, and incrementing the counter if the verification step fails due to a received incorrect password (un), aborting the current decryption session, and blocking further receiving user identification and password for a predetermined time.

12. A computer-implemented method for decrypting data by a server, in cooperation with a predetermined number of rate-limiters, the data being encrypted by the method of claim 10, the decrypting method comprising:
- receiving, by the server, from the user a user identification (un), and the password (pw),
- retrieving, by the server, the ciphertext (C), and the encrypted data stored in association with the user identification (un),
- recovering the secret message (M) by decrypting, by the server with its secret key ($sk_0$) in cooperation with a subset (P) of a size (t'), which is equal to or greater than the predetermined threshold (t), out of the predetermined number (m) of rate limiters with their respective secret keys ($sk_i$), the ciphertext (C), and deleting, by the server, the secret message (M) and the user password (pw),
- the method further comprising:
- decrypting, by the server, the encrypted user data (ud), by applying the predetermined user data symmetric key encryption/decryption scheme using the secret message (M) as decryption key.

13. The method of claim 1, further comprising:
- running, by the server, prior to creating the secret message (M), a setup algorithm comprising:
- defining the threshold (t), and the number (m) of rate limiters,
- generating the server secret key ($sk_0$), and
- generating for each rate limiter (i) of the predetermined number (m) of rate-limiters the respective secret key ($sk_i$),
- such that from each secret key ($sk_0, \ldots, sk_m$) the size (t) of the subset (P) of rate limiters, and the number (m) can be derived.

14. The method of claim 1, further comprising:
- initiated by the server at least one rate limiter out of the predetermined number (m) of rate limiters to perform, a rotation of the secret keys according to a predetermined key rotation protocol, and performing, by the server, an algorithm for updating the ciphertext (C) to an updated ciphertext (C') with keys produced in the key rotation protocol.

15. The method of claim 14, wherein the key rotation protocol comprises:
- initiating a rate limiter of the predetermined number (m) of rate limiters to request at least a part (r) of the predetermined number (m) of rate limiters to perform a respective key rotation, and receiving confirmation of the requested rate limiters about key rotation.

16. The method of claim 15, wherein the key rotation protocol comprises:
- requesting, by the server or initiating a rate limiter of the predetermined number (m) of rate limiters, a part (r) of the predetermined number (m) of rate limiters to perform a respective key rotation, to obtain updated secret keys ($sk'_1, \ldots sk'_r$), deriving an update token for updating the ciphertext (C).

17. The method of claim 16, wherein the key rotation comprises:
updating $$sk_i = (s_i, k_i, S_0, K_0, \{\overline{S}_j, \overline{K}_j\}_{j=0}^{t-1})$$

to $$sk'_i = (s'_i, k'_i, S'_0, K'_0, \{\overline{S}'_j, \overline{K}'_j\}_{j=0}^{t-1})$$

where $s'_0$ is a new symmetric encryption key, and the following properties hold:

$$K'_0 = K_0^\gamma = G^{k'_o}$$

$$\forall j \in [0, t-1] \quad \overline{S}'_j = \overline{S}_j G^{\beta_j}$$

$$\forall j \in [0, t-1] \quad \overline{K}'_j = \overline{K}_j^\gamma G^{\delta_j},$$

$$\forall i \in [m] \quad G^{s'_i} = \prod_{j=0} \overline{S}'^{i^j}_j$$

$$\forall i \in [m] \quad G^{k'_i} = \prod_{j=0} \overline{K}'^{i^j}_j$$

for $\overline{\beta}_0, \overline{\beta}_{t-1}, \gamma, \overline{\delta}_0, \ldots, \overline{\delta}_{t-1}$ being random integers sampled by the server, and the update token being defined as ($s_0$, $s'_0$, $\overline{\beta}_0$),
updating the ciphertext (C) to the updated ciphertext (C') such that the updated ciphertext (C') is given by encrypting the tuple (C0', C1') with the new symmetric encryption key ($s'_0$) where $$C'_0 := C_0 \cdot H_0(n)^{\overline{\beta}_0} \text{ and } C'_1 := C_1 \cdot H_1(n)^{\overline{\beta}_0}$$

n being a nonce produced by the server.

18. The method of claim 17, wherein the subset (P) of the predetermined number (m) of rate limiters is selected according to a predetermined access criterion.

* * * * *